(12) United States Patent
Liu

(10) Patent No.: US 7,038,749 B2
(45) Date of Patent: May 2, 2006

(54) REFLECTOR STRUCTURE IN A LIQUID CRYSTAL DISPLAY HAVING LIGHT CONDENSING EFFECT

(75) Inventor: Hong-Da Liu, Juipei (TW)

(73) Assignee: Wistron Optronics Corporation, Hsinchu (TW)

( * ) Notice: Subject to any disclaimer, the term of this patent is extended or adjusted under 35 U.S.C. 154(b) by 0 days.

(21) Appl. No.: 11/037,692

(22) Filed: Jan. 15, 2005

(65) Prior Publication Data

US 2005/0122449 A1 Jun. 9, 2005

Related U.S. Application Data

(62) Division of application No. 10/603,914, filed on Jun. 24, 2003.

(30) Foreign Application Priority Data

Jul. 30, 2002 (TW) .............................. 91116986 A

(51) Int. Cl.
*G02F 1/1335* (2006.01)
(52) U.S. Cl. .................. 349/114; 349/113; 349/95
(58) Field of Classification Search ................ 349/114, 349/95, 113
See application file for complete search history.

(56) References Cited

U.S. PATENT DOCUMENTS

| 5,764,323 | A * | 6/1998 | Fukuda ..................... 349/95 |
| 6,359,719 | B1 * | 3/2002 | Ori ........................... 359/242 |
| 6,788,367 | B1 * | 9/2004 | Chang et al. ............. 349/114 |
| 6,809,785 | B1 * | 10/2004 | Fujino ..................... 349/114 |
| 6,819,379 | B1 * | 11/2004 | Kubo et al. .............. 349/114 |
| 2005/0083460 | A1 * | 4/2005 | Hattori et al. ............ 349/114 |

* cited by examiner

Primary Examiner—Toan Ton

(57) ABSTRACT

A reflector structure in a liquid crystal display having light condensing effect comprises mainly an active device substrate, a condenser having diffraction or refraction effect being formed above the substrate, a spacing layer being formed above and covering the condenser, and a reflective unit being formed above the spacing layer. The condenser can be a holographic diffraction unit, micro prisms or micro lens unit. It can be on a TFT substrate or a color filter. The color filter can be located at the same or opposite side with the TFT substrate. The spacing layer may be an over coat layer, a color filter, a color filter and an over coat layer on the color filter, or a substrate. The reflective unit also has various structures, reflective angles, and reflective effects. The invention utilizes the condenser to collect light. 60% to 95% of unused backlight is collected. The backlight gain is over 120% to 400%, thereby greatly saving the power consumption for the backlight source.

11 Claims, 24 Drawing Sheets

REFLECTOR STRUCTURE IN A LIQUID CRYSTAL DISPLAY HAVING LIGHT CONDENSING EFFECT

CROSS-REFERENCES TO RELATED APPLICATIONS

This is a division of U.S. application Ser. No. 10/603,914, filed Jun. 24, 2003.

FIELD OF THE INVENTION

The present invention generally relates to a partially reflective liquid crystal display, and more specifically to a reflector structure in a liquid crystal display having light condensing effect.

BACKGROUND OF THE INVENTION

Because of the advantages in light weight, thin thickness and low power consumption, conventional partially reflective liquid crystal displays are mostly applied to portable products, such as cellular phone and personal digital assistant (PDA). In order to take care of the reflective optical performance, the light transparent area can not be large. Aperture ratio is about 15% to 40%. This induces waste of backlight source. FIG. 1 shows a cross-sectional view of a conventional reflector structure in a partially reflective liquid crystal display. In FIG. 1, a reflective unit 103 and a light transparent area 105 are formed on a substrate 101. In general, aperture ratio of the light transparent area is about 5% to 40%. Backlight source 107 is reflected back by the reflective unit 103 when it passes through the reflective area. This induces energy waste of backlight source.

SUMMARY OF THE INVENTION

The present invention has been made to overcome the above-mentioned drawback of waste of backlight source in a conventional partially reflective liquid crystal display. An object of the present invention is to provide a reflector structure in a liquid crystal display having light condensing effect that is applicable to partially reflective liquid crystal displays and their reflectors, as well as transparent liquid crystal displays with high resolution. The present invention provides a layer of condenser having diffraction or refraction effect to collect light, so that the transparent area of the reflector of partially reflective liquid crystal displays or transparent liquid crystal displays has a high gain of light condensing effect. 60% to 95% of unused backlight was collected. The backlight gain is over 120% to 400%, thereby substantially reducing the power consumption for the backlight source.

The reflector structure in a liquid crystal display having light condensing effect comprises mainly a condenser having diffraction or refraction effect, a spacing layer, and a reflective unit. The spacing layer is located between the condenser and the reflective unit.

According to the present invention, the condenser having diffraction or refraction effect can be designed inside or outside the liquid crystal cells. If the condenser is inside the liquid crystal cells, it is formed above the lower substrate of the liquid crystal display. On the contrary, if the condenser is outside the liquid crystal cells, it is formed below the lower substrate of the liquid crystal display. In other words, the lower substrate is used as the spacing layer between the condenser and the reflective unit. The condenser of the invention can be designed on a TFT substrate or on a color filter. The color filter can be placed on the same side or at the opposite side of the TFT substrate.

The spacing layer in the reflector structure of the invention has many modes. Five preferred embodiments of these modes are: (a) including an over coat layer being formed on the condenser having diffraction or refraction effect; (b) including a color filter being formed on the condenser having diffraction or refraction effect; (c) including a color filter being formed on the condenser having diffraction or refraction effect and an over coat layer being formed on the color filter; and (d) including a substrate being formed on the condenser having diffraction or refraction effect.

The reflective unit in the reflector structure of the invention has many modes too. Four preferred embodiments of these modes are: (a) including a flat metal layer being formed on the spacing layer and an ITO electrode layer being formed on the spacing layer and above the aperture; (b) including an inner diffusion layer being formed on the spacing layer, a reflective metal layer being formed on the inner diffusion layer, and an ITO electrode layer being formed on the spacing layer and above the aperture, where the inner diffusion layer forms convex or concave structures around the pixel area, in the pixel area, or around the boundary of the transparent area, the average gap $d_T$ of liquid crystal cells in the transparent area T is different from the average gap $d_R$ of liquid crystal cells in the reflective area R within a single pixel area; (c) including an inner diffusion layer being formed on the spacing layer, a reflective metal layer being formed on the inner diffusion layer, and an ITO electrode layer being formed on the spacing layer and above the aperture, where there is only one gap of liquid crystal cells within a single pixel area; and (d) including the mode (b) in every red, green and blue sub-pixel within a single pixel area.

The condenser having diffraction or refraction effect in the reflector structure of the invention has many modes too. Five preferred embodiments of these modes are: (a) comprising metals with periodic patterns and various widths and distances; (b) comprising one layer of transparent materials with unit refractive index, periodic patterns and various widths and distances, and covering another layer of transparent materials with different refractive index on the previous layer; (c) comprising one layer of multi-level transparent materials with unit refractive index and periodic patterns, and covering another layer of transparent materials with different refractive index on the previous layer; (d) comprising a layer of several wedge-shaped micro prisms with unit refractive index and periodic patterns, and covering another layer of transparent materials with different refractive index on the layer of micro prisms; and (e) comprising a layer of several different size micro lens with unit refractive index and periodic patterns, and covering another layer of transparent materials with different refractive index on the layer of micro lens.

Another object of the present invention is to provide a liquid crystal display having light condensing effect. The liquid crystal display comprises the reflector structure mentioned above and can be used in partially reflective liquid crystal displays as well as reflective liquid crystal displays. There are three preferred embodiments.

In the first preferred embodiment, the condenser of the liquid crystal display is located at the same side with and below the TFT substrate, the color filter is located at the opposite side against the substrate, the condenser divides light from the backlight source into different intensity and wavelength and condenses light in corresponding sub-pixel areas, then the light passes to the layer of liquid crystal cells and the color filter.

In the second preferred embodiment, the first color filter, the condenser and the TFT substrate are located at the same side and above the TFT substrate, the second color filter is located at the opposite side against the substrate, the first and second color filters use the same material and have the same thickness.

In the third preferred embodiment, the first color filter, the condenser and the TFT substrate are located at the same side and above the TFT substrate, the second color filter is located at the opposite side against the substrate, the first and second color filters use different material and have different thickness.

Using the high-gain condenser of the invention to condense backlight, about 95% to 60% originally unused backlight is collected, thereby greatly saving the power consumption for the backlight source. The maximal effect can be achieved when the angle of the backlight source is about 40 degree. Because of the wall bump structure in the inner diffusion layer of the reflective unit and the aperture electrode in the transparent electrode layer, this invention needs no rubbing process to control the pre-tilt angle of the liquid crystal director. Therefore, the partially reflective liquid crystal display having the reflector structure of the invention forms multi-domain and further has very high contrast ratio and wide viewing angle.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein:

FIG. 3b illustrates the structure of an aperture near the center of the transparent area T at the ITO electrode layer in the reflective unit of FIG. 3a;

FIG. 5 shows a cross-sectional view of red, green and blue sub-pixels within a single pixel area of FIG. 3a;

DETAILED DESCRIPTION OF THE PREFERRED EMBODIMENTS

Figure 1:
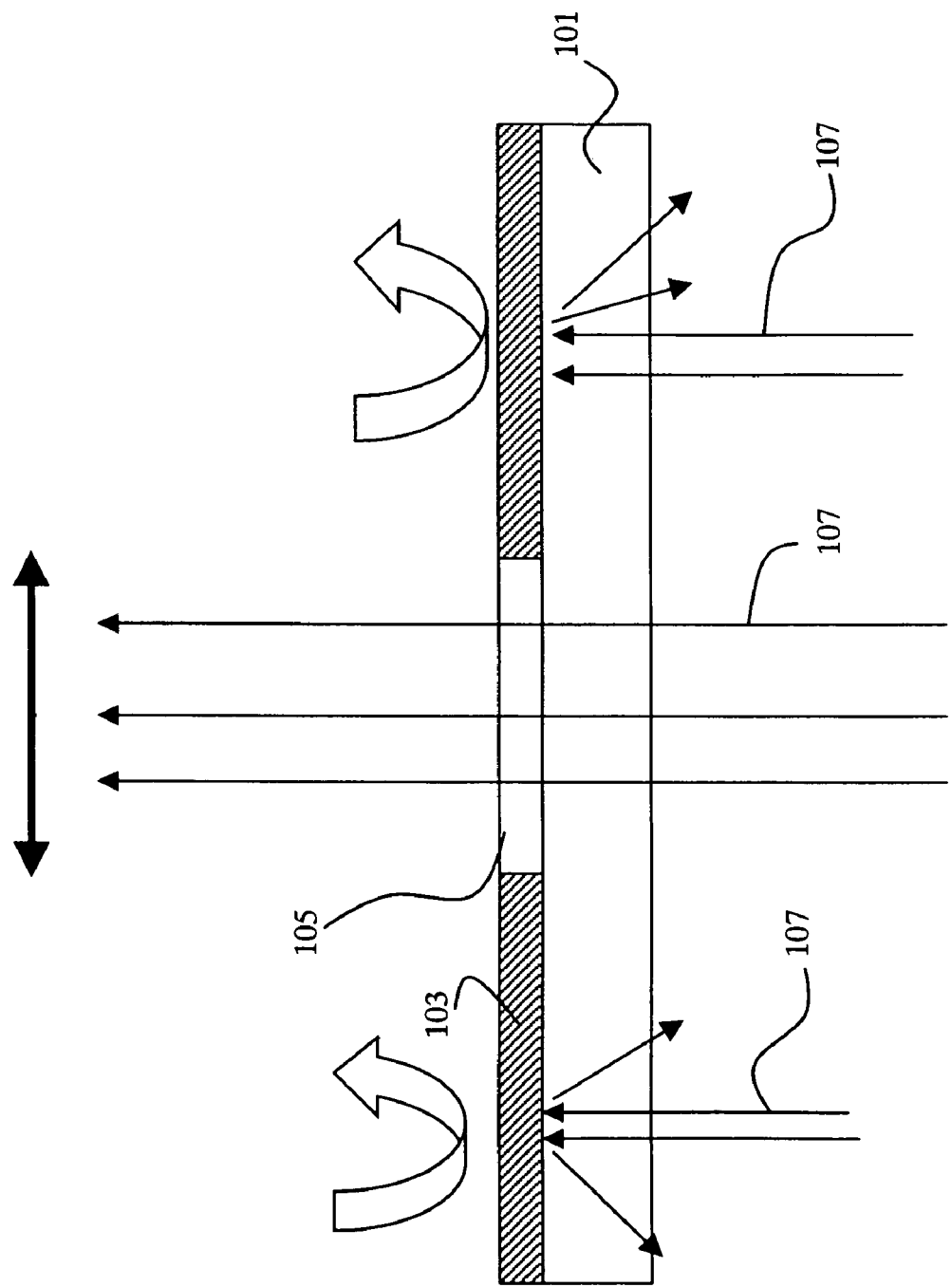
FIG. 1 shows a cross-sectional view of a conventional reflector structure in a partially reflective liquid crystal display.
Figure 2:
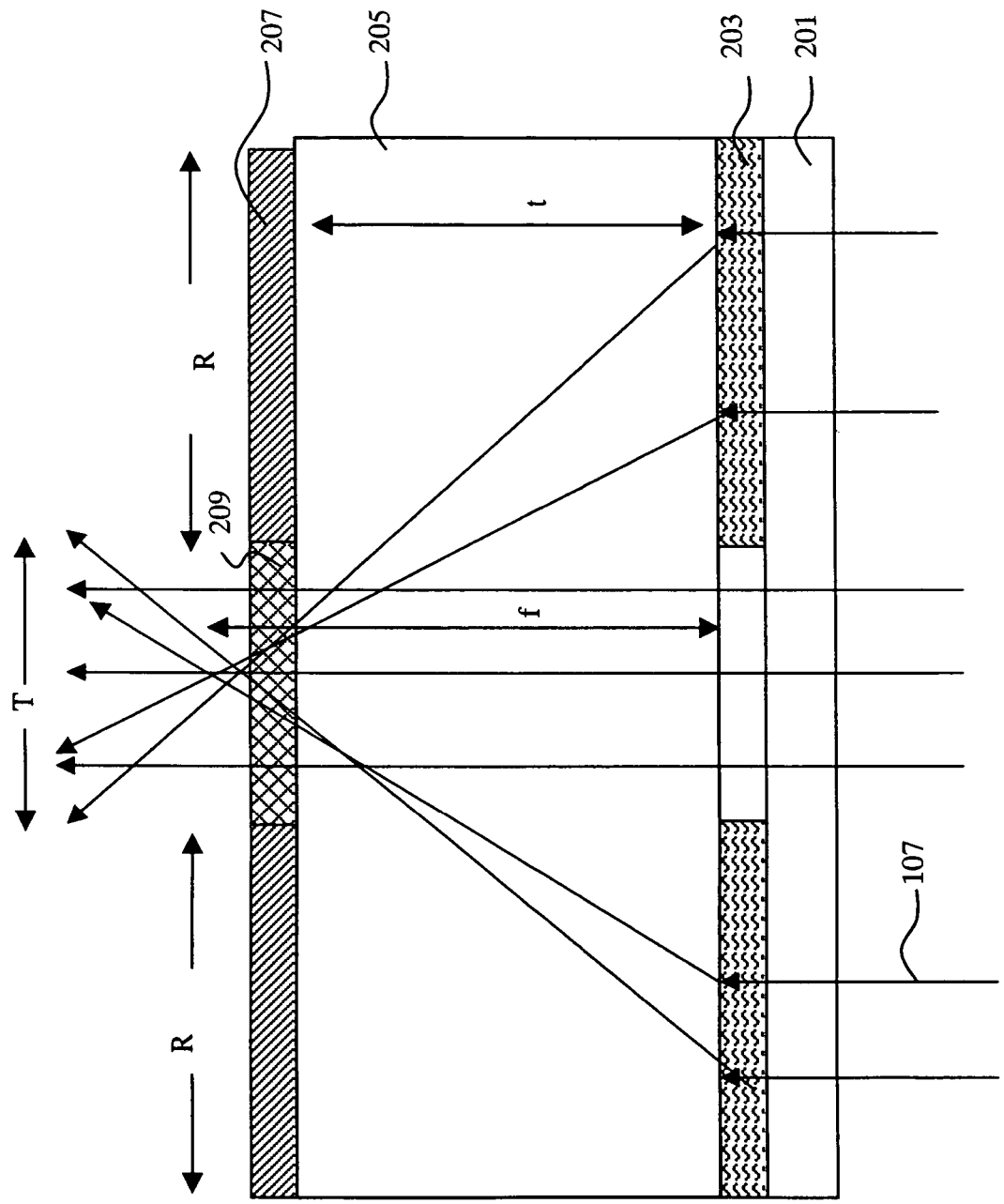
FIG. 2 shows a cross-sectional view of the first embodiment of a reflector structure in a liquid crystal display having light condensing effect, being applied to a partially reflective liquid crystal display.

FIG. 2 shows a cross-sectional view of the first embodiment of a reflector structure in a liquid crystal display having light condensing effect being applied to a partially reflective liquid crystal display. The reflector structure comprises an active device substrate 201, a condenser 203 having diffraction or refraction effect being formed above the substrate 201, a spacing layer 205 being formed above and covering the condenser 203, and a reflective unit being formed above the spacing layer 205. The condenser 203 has an averaged equivalent focus f. The spacing layer 205 has a thickness t greater than zero.

In the preferred embodiment, the reflective unit comprises a flat reflective metal layer 207 and an ITO electrode layer 209 formed above the spacing layer 205, wherein the condenser 203 and the reflective metal layer 207 are in the reflective area R of the pixel and the ITO electrode layer 209 is in the transparent area T of the pixel. The condenser 203 collects light 107 emitting from the back light source and passing through the substrate 201. Therefore, the transparent area T of the reflector has high efficiency of condensing light.

Figure 3A:
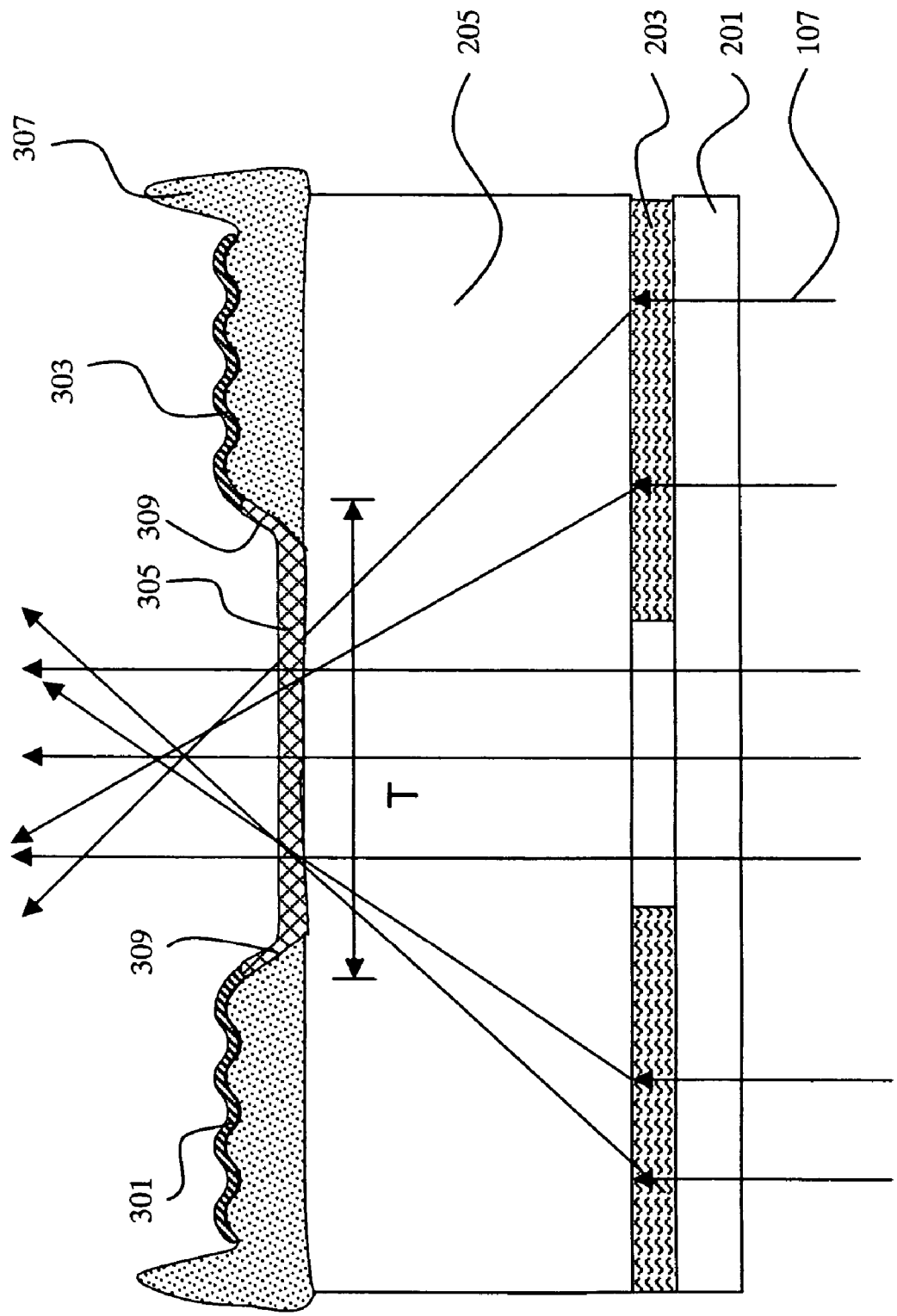
FIG. 3a shows a cross-sectional view of the second embodiment of a reflector structure in a liquid crystal display having light condensing effect, being applied to a partially reflective liquid crystal display.

FIG. 3a shows a cross-sectional view of the second embodiment of a reflector structure in a liquid crystal display having light condensing effect, being applied to a partially reflective liquid crystal display. The difference between FIG. 2 and FIG. 3a is the reflective unit in the reflector structure. The reflective unit in FIG. 3a comprises an inner diffusion layer 301 formed above the spacing layer 205, a reflective metal layer 303 formed above the inner diffusion layer 301 and in the reflective area, and an ITO electrode layer 305 formed above the spacing layer 205 and in the transparent area T. The inner diffusion layer 301 forms convex structures 307 around the pixel. The ITO electrode layer 305 forms concave structures 309 at the boundary of the transparent area T. Within a single pixel area, the average gap $d_T$ of liquid crystal cells in the transparent area T is less than the average gap $d_R$ of liquid crystal cells in the reflective area R.

Figure 3B:
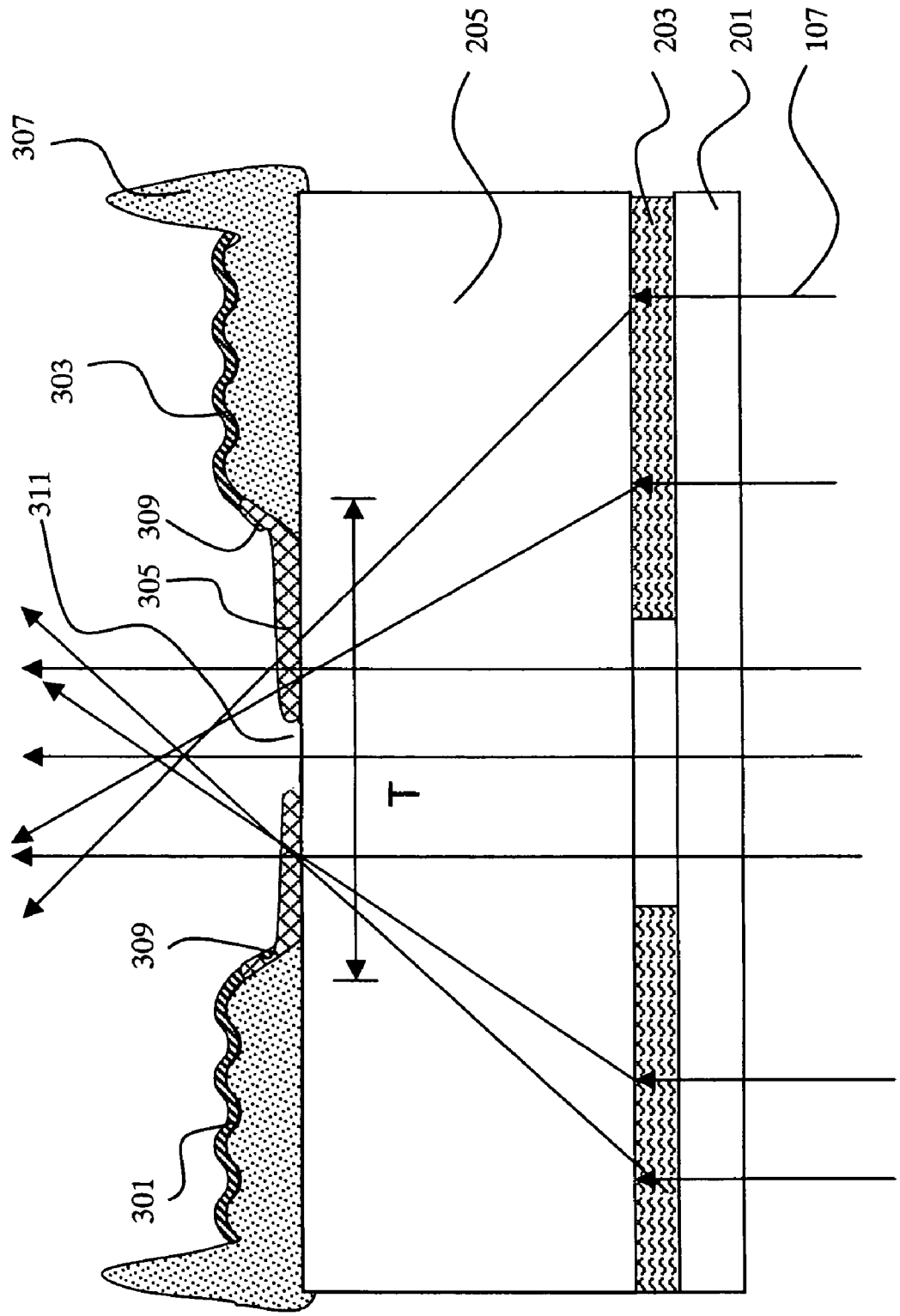

The ITO electrode layer 305 in the reflective unit shown in FIG. 3a can be designed to have an aperture near the center of the transparent area T, such as the aperture 311 shown in FIG. 3b.

Figure 4:
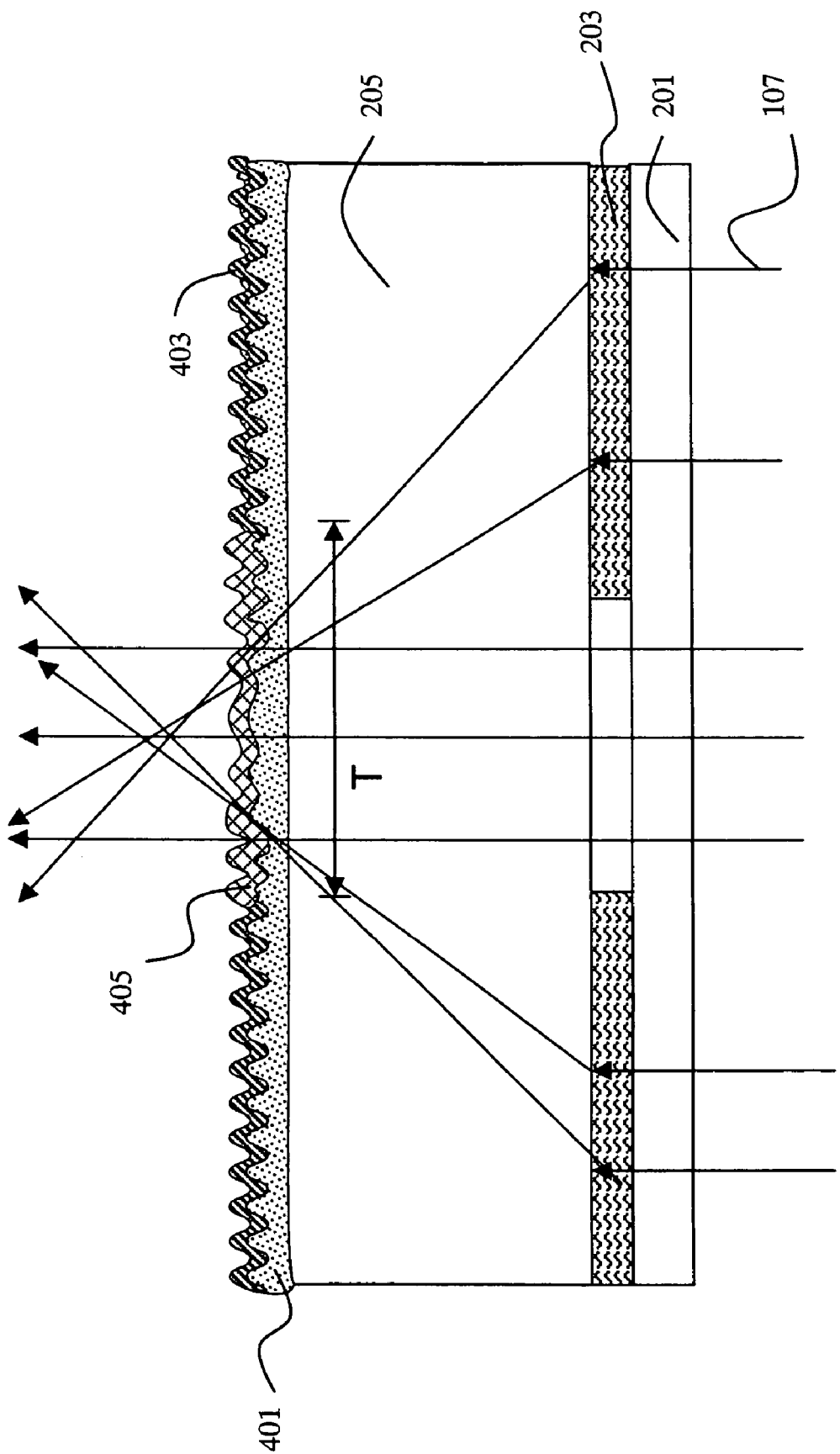
FIG. 4 shows a cross-sectional view of the third embodiment of a reflector structure in a liquid crystal display having light condensing effect, being applied to a partially reflective liquid crystal display.

FIG. 4 shows a cross-sectional view of the third embodiment of a reflector structure in a liquid crystal display having light condensing effect, being applied to a partially reflective liquid crystal display. The difference between FIG. 4 and FIG. 3a is that the average gap of liquid crystal cells in the transparent area T is equal to that of liquid crystal cells in the reflective area R. In other words, there is only one gap of liquid crystal cells within a single pixel area. Referring to the top of the inner diffusion layer 401 shown in FIG. 4, the average gaps of liquid crystal cells are equal in the reflective metal layer 403 of the reflective area R and in the ITO electrode layer 405 of the transparent area T.

Figure 5:
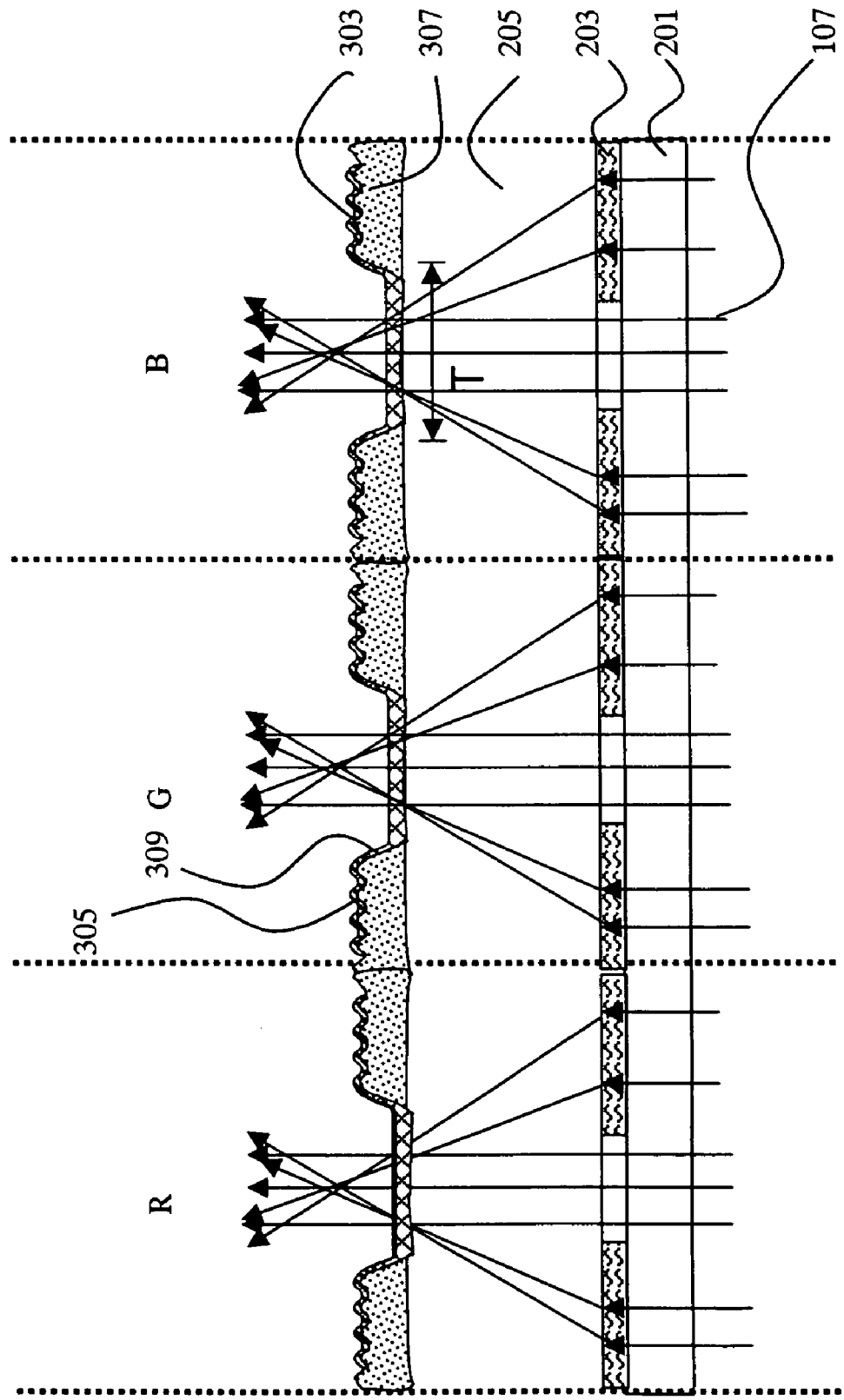

In order to explain the following description in more detail, FIG. 5 shows a cross-sectional view of red, green and blue sub-pixels within a single pixel area of FIG. 3a.

Figure 6:
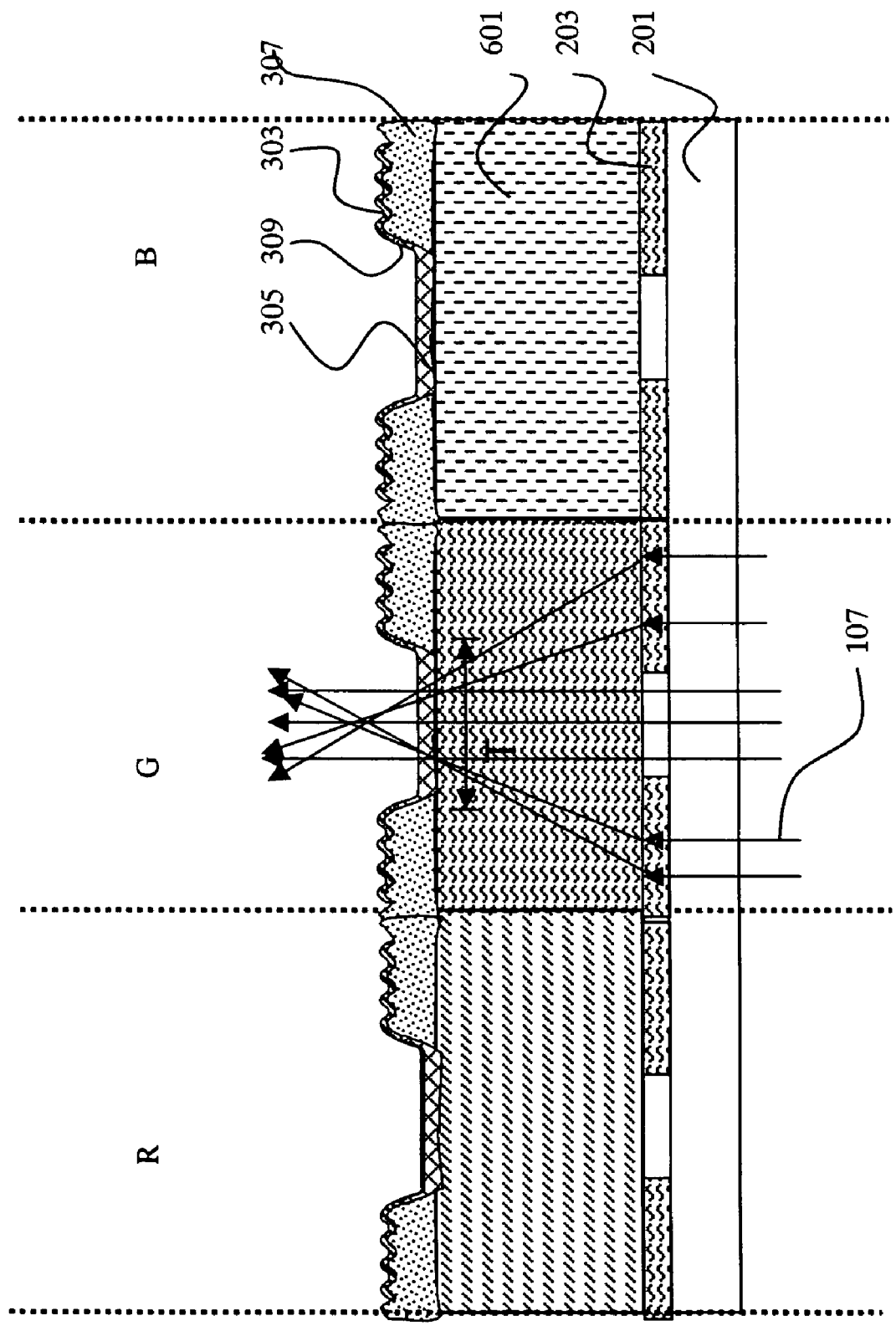
FIG. 6 shows a cross-sectional view of the fourth embodiment of a reflector structure in a liquid crystal display having light condensing effect, being applied to a partially reflective liquid crystal display.

FIG. 6 shows a cross-sectional view of the fourth embodiment of a reflector structure in a liquid crystal display having light condensing effect, being applied to a partially reflective liquid crystal display. The difference between FIG. 6 and FIG. 5 is the spacing layer in the reflector structure. The spacing layer shown in FIG. 6 uses a color filter 601.

Figure 7:
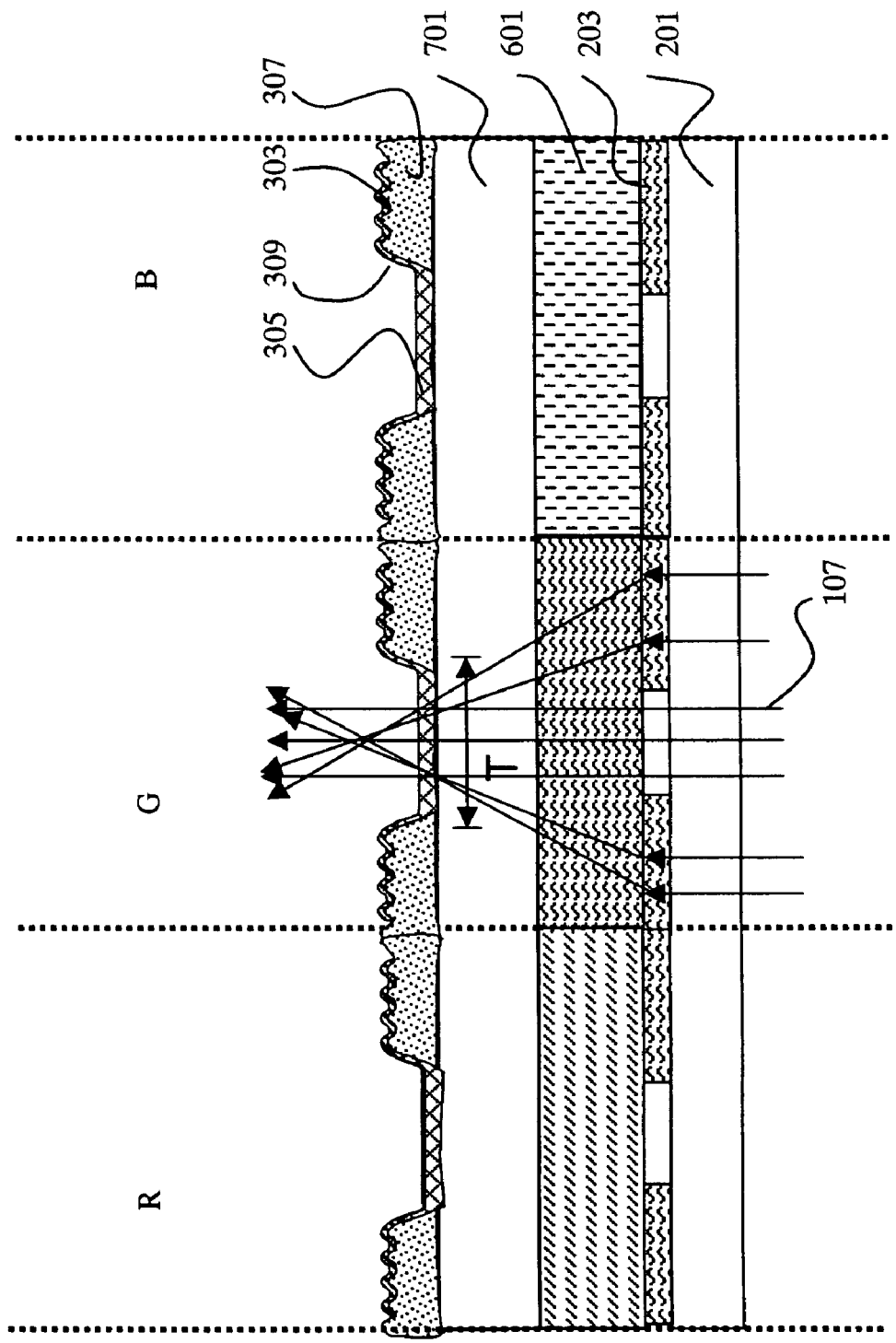
FIG. 7 shows a cross-sectional view of the fifth embodiment of a reflector structure in a liquid crystal display having light condensing effect, being applied to a partially reflective liquid crystal display.

FIG. 7 shows a cross-sectional view of the fifth embodiment of a reflector structure in a liquid crystal display having light condensing effect, being applied to a partially reflective liquid crystal display. The difference between FIG. 7 and FIG. 6 is the spacing layer in the reflector structure. The spacing layer shown in FIG. 7 uses not only a color filter 601 but also an over coat layer 701 coated on the color filter 601.

Figure 8:
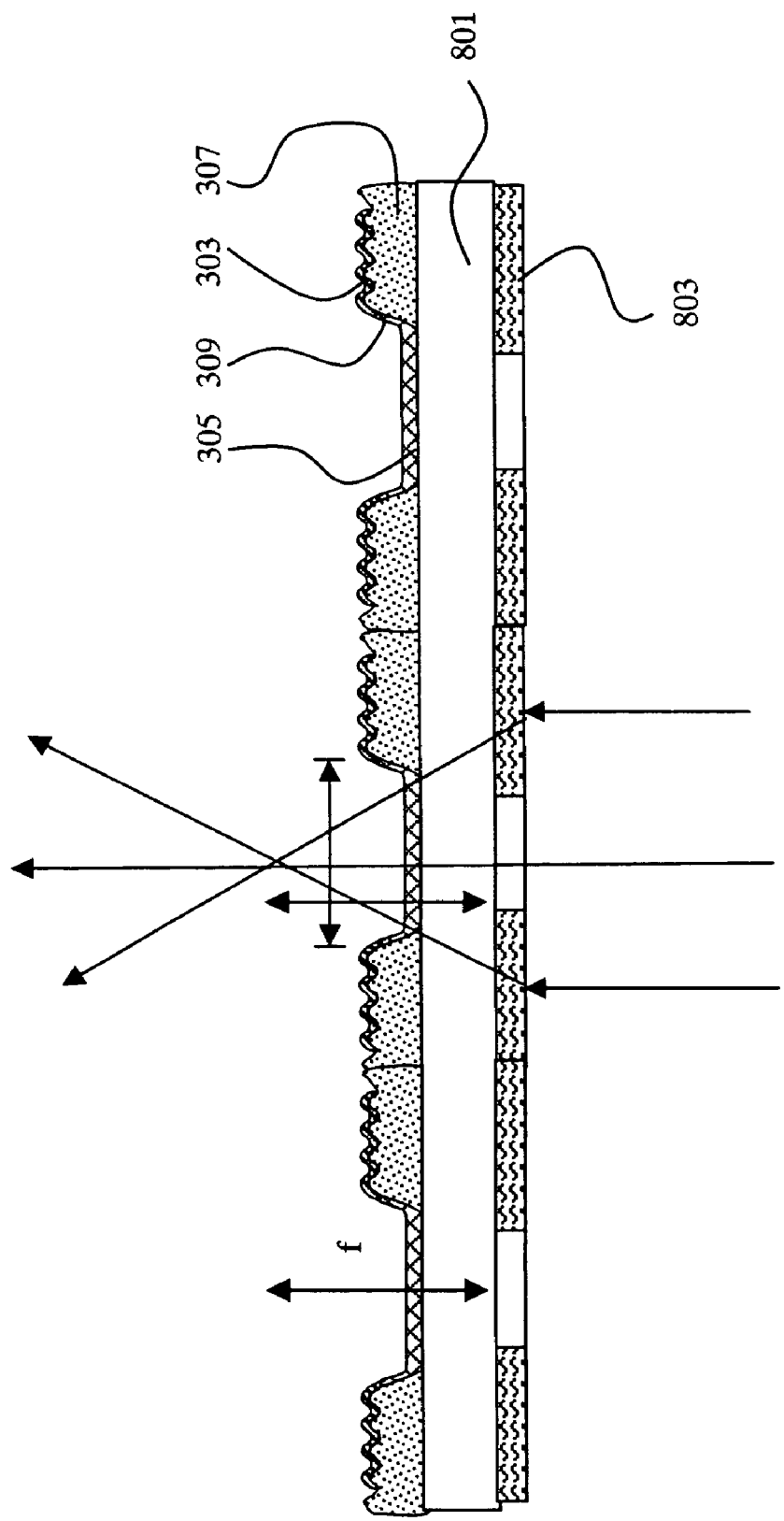
FIG. 8 shows a cross-sectional view of the sixth embodiment of a reflector structure in a liquid crystal display having light condensing effect, being applied in a partially reflective liquid crystal display.

FIG. 8 shows a cross-sectional view of the sixth embodiment of a reflector structure in a liquid crystal display having light condensing effect, being applied to a partially reflective liquid crystal display. The differences between FIG. 8 and FIG. 5 are the spacing layer in the reflector structure and the location of the condenser. FIG. 8 uses a substrate 801 as the spacing layer between the condenser 803 and the reflective unit.

Figure 9:
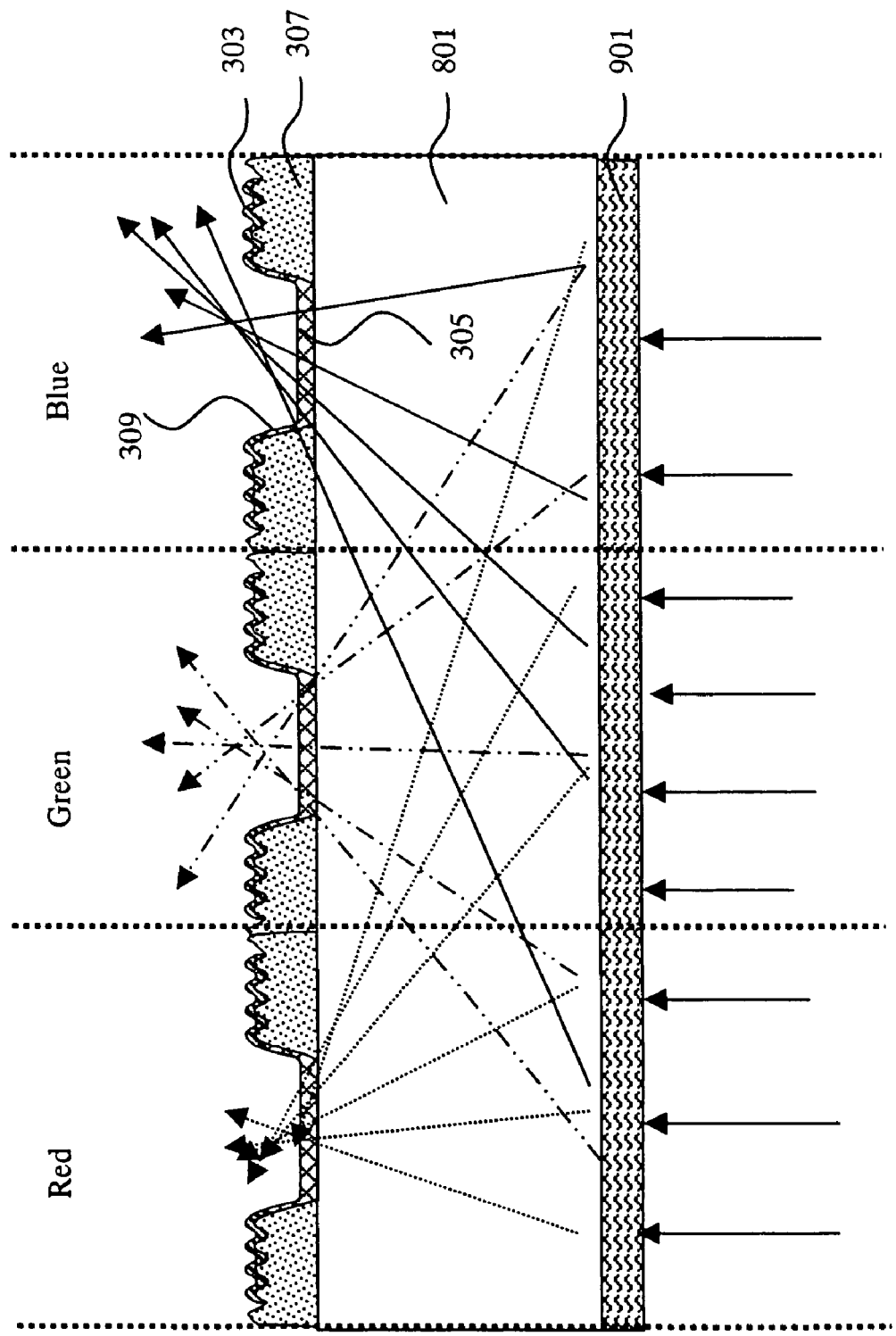
FIG. 9 shows a cross-sectional view of the seventh embodiment of a reflector structure in a liquid crystal display having light condensing effect, being applied to a partially reflective liquid crystal display.

FIG. 9 shows a cross-sectional view of the seventh embodiment of a reflector structure in a liquid crystal display having light condensing effect, being applied to a partially reflective liquid crystal display. The difference between FIG. 9 and FIG. 8 is the condenser in the reflector structure. The condenser 901 shown in FIG. 9 divides light from the backlight source into red, green and blue lights and condenses light in their corresponding sub-pixel areas. Therefore, the reflector structure greatly improves light efficiency.

Figure 10:
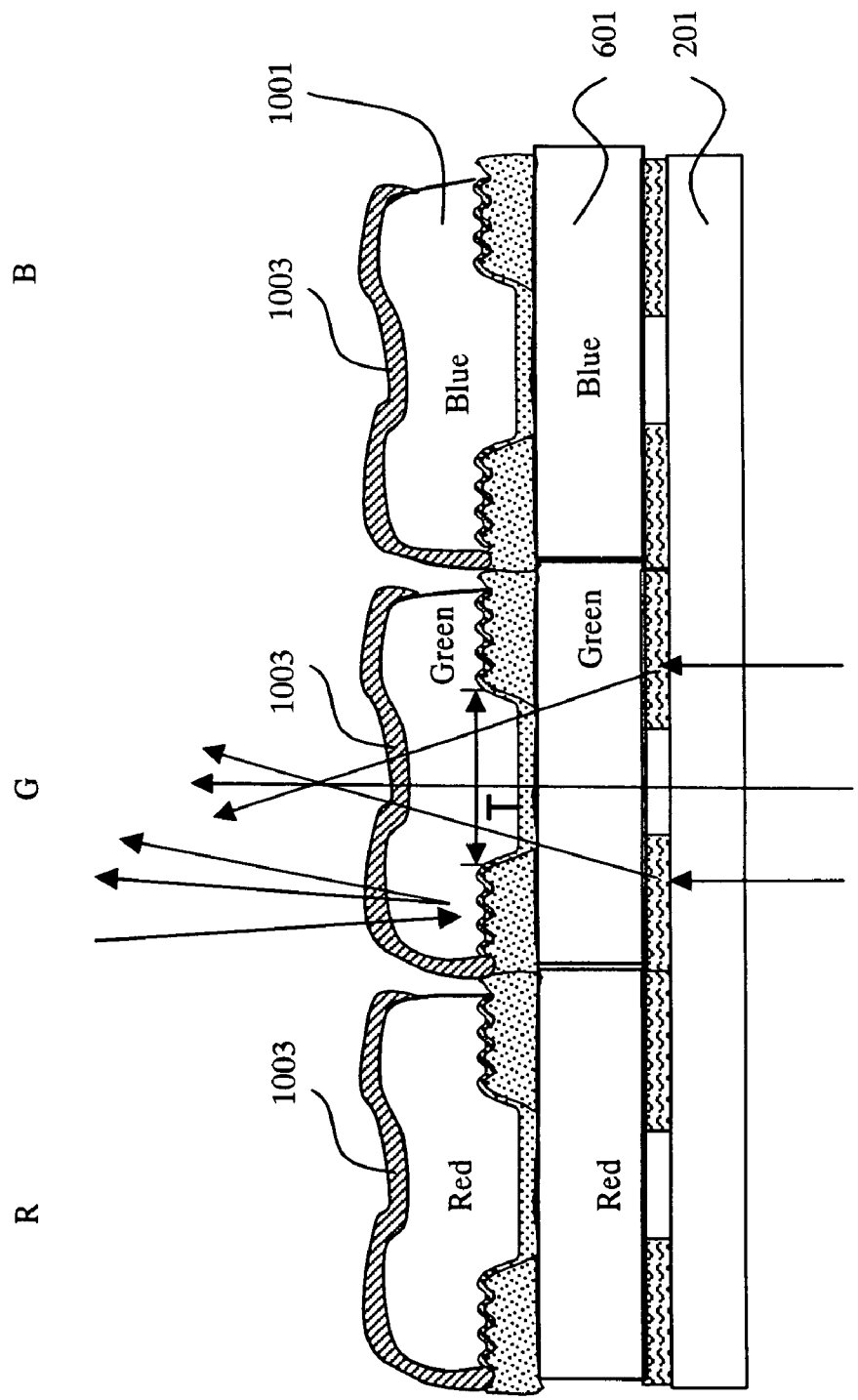
FIG. 10 shows a cross-sectional view of the eighth embodiment of a reflector structure in a liquid crystal display having light condensing effect, being applied to a partially reflective liquid crystal display.

FIG. 10 shows a cross-sectional view of the eighth embodiment of a reflector structure in a liquid crystal display having light condensing effect, being applied to a partially reflective liquid crystal display. The differences between FIG. 10 and FIG. 6 are: a second color filter 1001 is formed on the reflective unit in the reflector structure and an ITO electrode layer 1003 is formed on the second color filter 1001 in red, green and blue sub-pixel areas, as shown in FIG. 10. The reflector structure uses a first color filter as spacing layer and uses a second color filter to cover the reflector. Color in the reflective area is more pure since it passes the second color filter and is filtered twice. Color in the transparent area passes the first color filter and the second color filter and is filtered once by the second color filter. It is worthy to mention that the first color filter 601 and the second color filter 1001 are on the same substrate 201.

Figure 11:
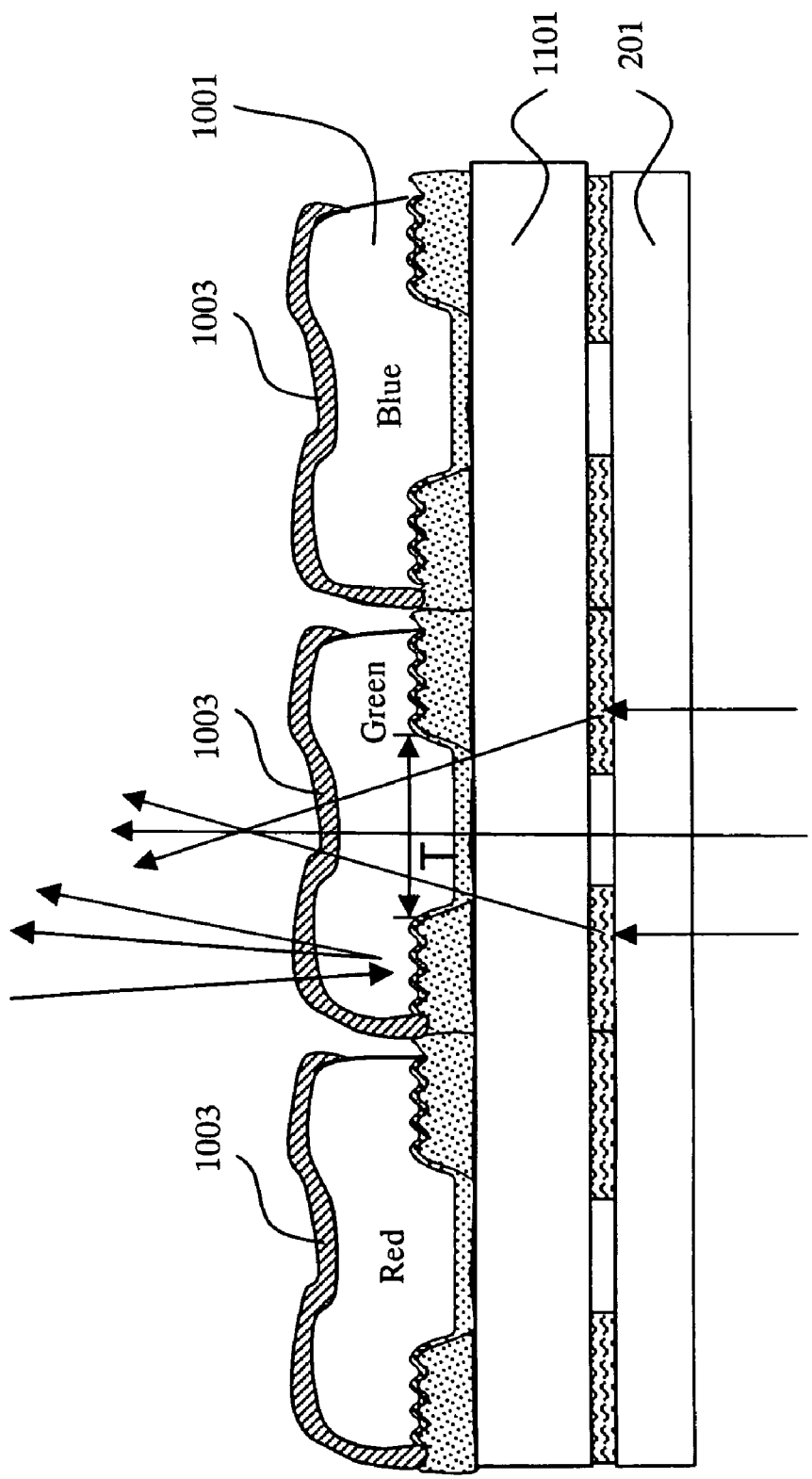
FIG. 11 shows a cross-sectional view of the ninth embodiment of a reflector structure in a liquid crystal display having light condensing effect, being applied to a partially reflective liquid crystal displays.

FIG. 11 shows a cross-sectional view of the ninth embodiment of a reflector structure in a liquid crystal display having light condensing effect, being applied to a partially reflective liquid crystal display. The difference between FIG. 11 and FIG. 10 is the spacing layer in the reflector structure. The reflector structure shown in FIG. 10 uses the first color filter 601 as spacing layer and the reflector structure shown in FIG. 11 uses an over coat layer 1101 as spacing layer. Color in the reflective area of the reflector structure shown in FIG. 11 is more pure since it passes the second color filter and is filtered twice. Additionally, color in the transparent area passes the second color filter and is filtered once by the second color filter.

According to the preferred embodiments mentioned above, the spacing layer in the reflector structure of the present invention can have many different kinds of structure. It includes an over coat layer formed above the condenser as shown in FIG. 2, a color filter formed above the condenser as shown in FIG. 6, a color filter formed above the condenser and an over coat layer formed above the color filter as shown in FIG. 7, and a substrate formed above the condenser as shown in FIG. 8.

The spacing layer can be coated by positive photoresist or negative photoresist. Its thickness t is between 2 to 20 μm. The ratio f/t of the averaged equivalent focus f of the condenser to the thickness t of the spacing layer is between 0.65 and 1.4.

The reflective unit in the reflector structure of the present invention has many different kinds of structure too. It includes: a flat reflective metal layer being formed above the spacing layer and an ITO electrode layer being formed above the spacing layer as shown in FIG. 2; an inner diffusion layer being formed above the spacing layer, a reflective metal layer being formed above the inner diffusion layer, and an ITO electrode layer being formed above the spacing layer in the transparent area of the liquid crystal display, as shown in FIGS. 3a–3b, where the inner diffusion layer forms convex structures around the pixel and within the pixel area of the liquid crystal display and concave structures at the boundary of the transparent area, the average gap $d_T$ of liquid crystal cells in the transparent area is different from the average gap $d_R$ of liquid crystal cells in the reflective area within a single pixel area; and an inner diffusion layer being formed above the spacing layer, a reflective metal layer being formed above the inner diffusion layer, and an ITO electrode layer being formed above the spacing layer in the transparent area, as shown in FIG. 4, where there is only one gap of liquid crystal cells within a single pixel area, and a mode of FIG. 3 formed on the first color filter and an ITO electrode layer formed on the second color filter in red, green and blue sub-pixel areas of each single pixel as shown in FIG. 10 and FIG. 11.

FIGS. 12–15 show four kinds of light patterns within a single pixel area on four kinds of reflective layers after the condensing effect of the condenser, each light pattern respectively corresponding to a structure of an associated reflective layer including reflective area and transparent area within a single pixel area.

Figure 12:
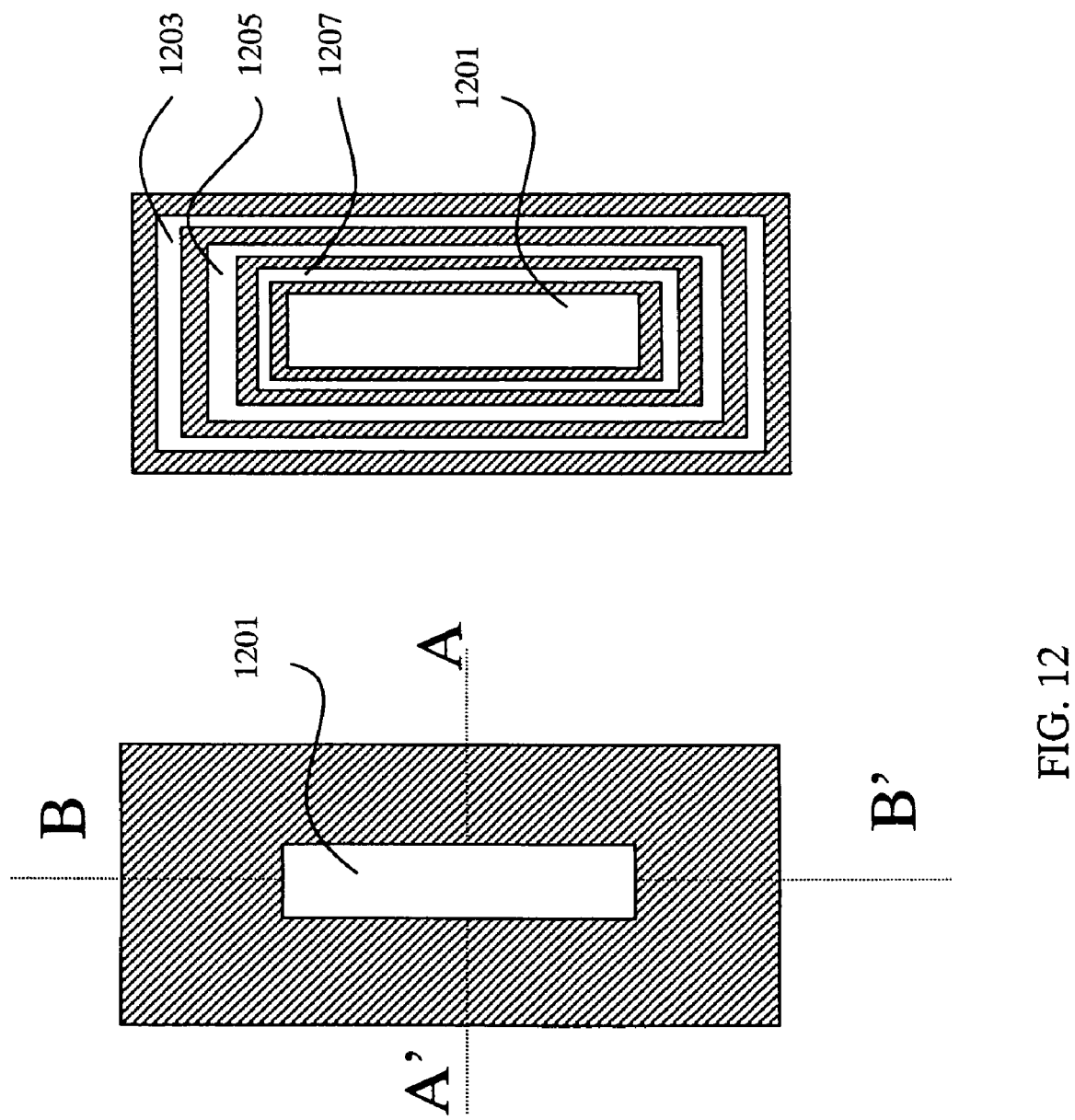
FIGS. 12–15 show four kinds of light patterns within a single pixel area on four kinds of reflective layers after the condensing effect of the condenser, each light pattern respectively corresponding to a structure of an associated reflective layer including reflective area and transparent area within a single pixel area.

The left figure of FIG. 12 shows a configuration of reflective layer where slanted line portion represents the reflective area and the other is the transparent area. The corresponding light pattern by the associated condenser is shown at the right figure. Referring to the right figure of FIG. 12, in addition to the original aperture 1201, there are three extra grating apertures 1203, 1205 and 1207 in the transparent area. The backlight gain is obviously increased, thereby saving the power consumption for the backlight source.

Figure 13:
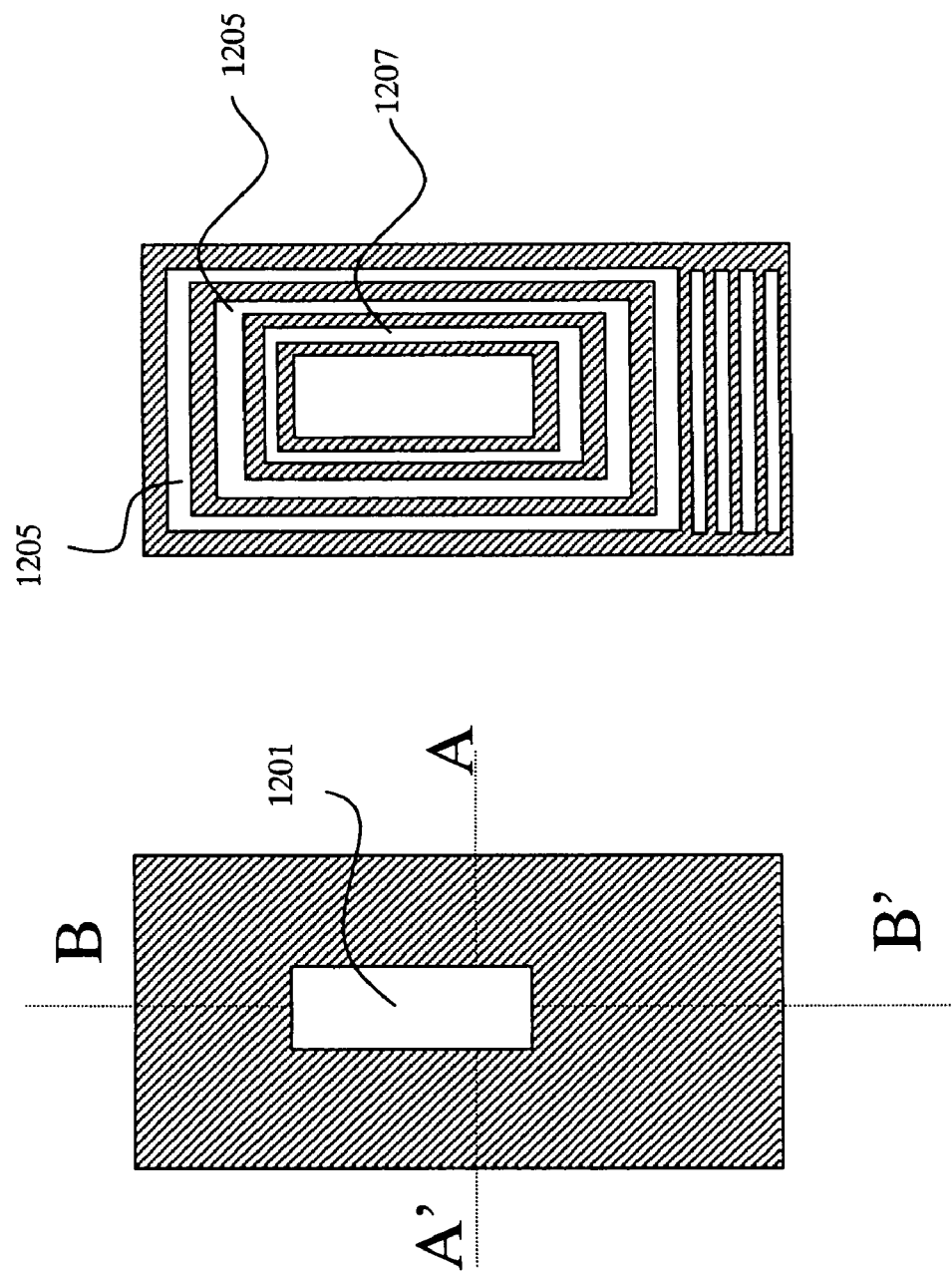
Figure 14:
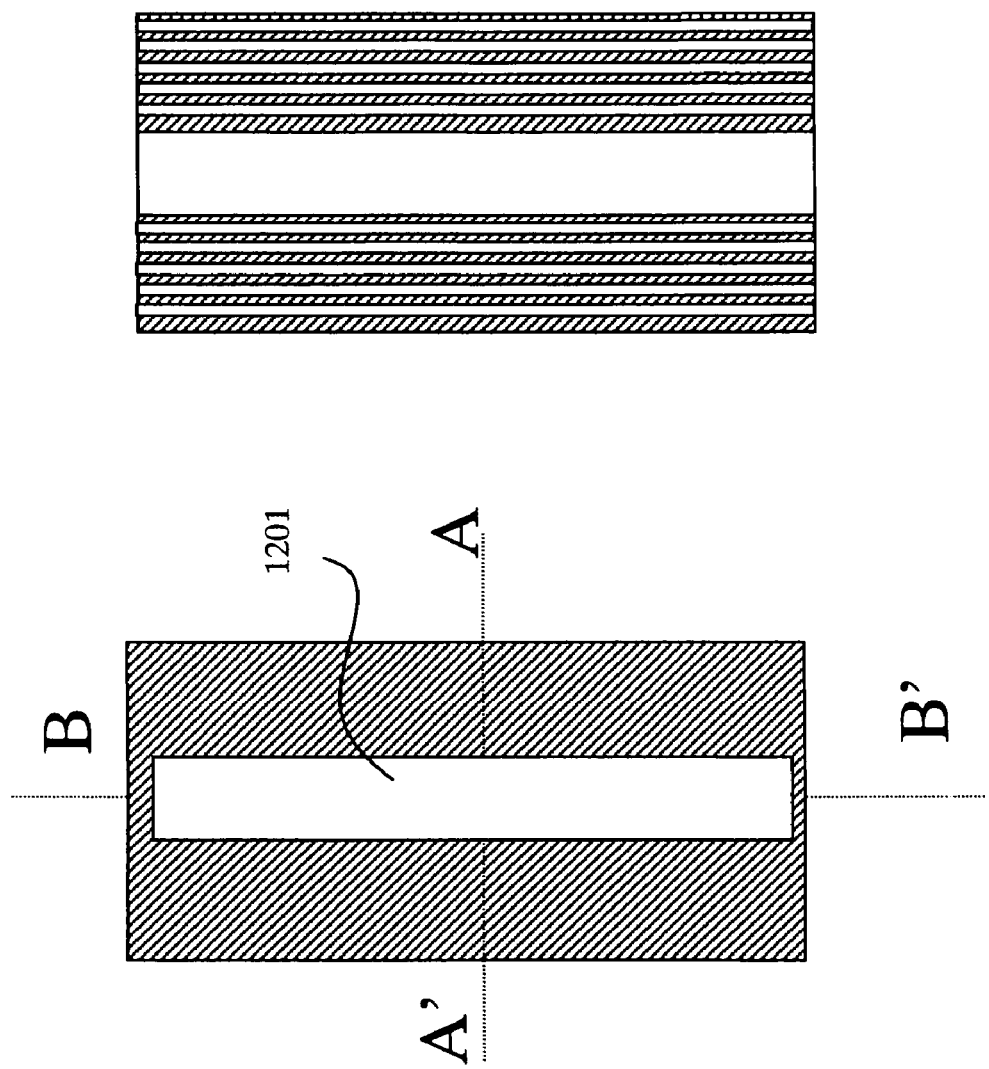

FIG. 13 and FIG. 14, respectively illustrate the light patterns introduced by the diffraction of the condenser by means of decreasing or increasing the length of aperture shown in the left figure of FIG. 12.

Figure 15:
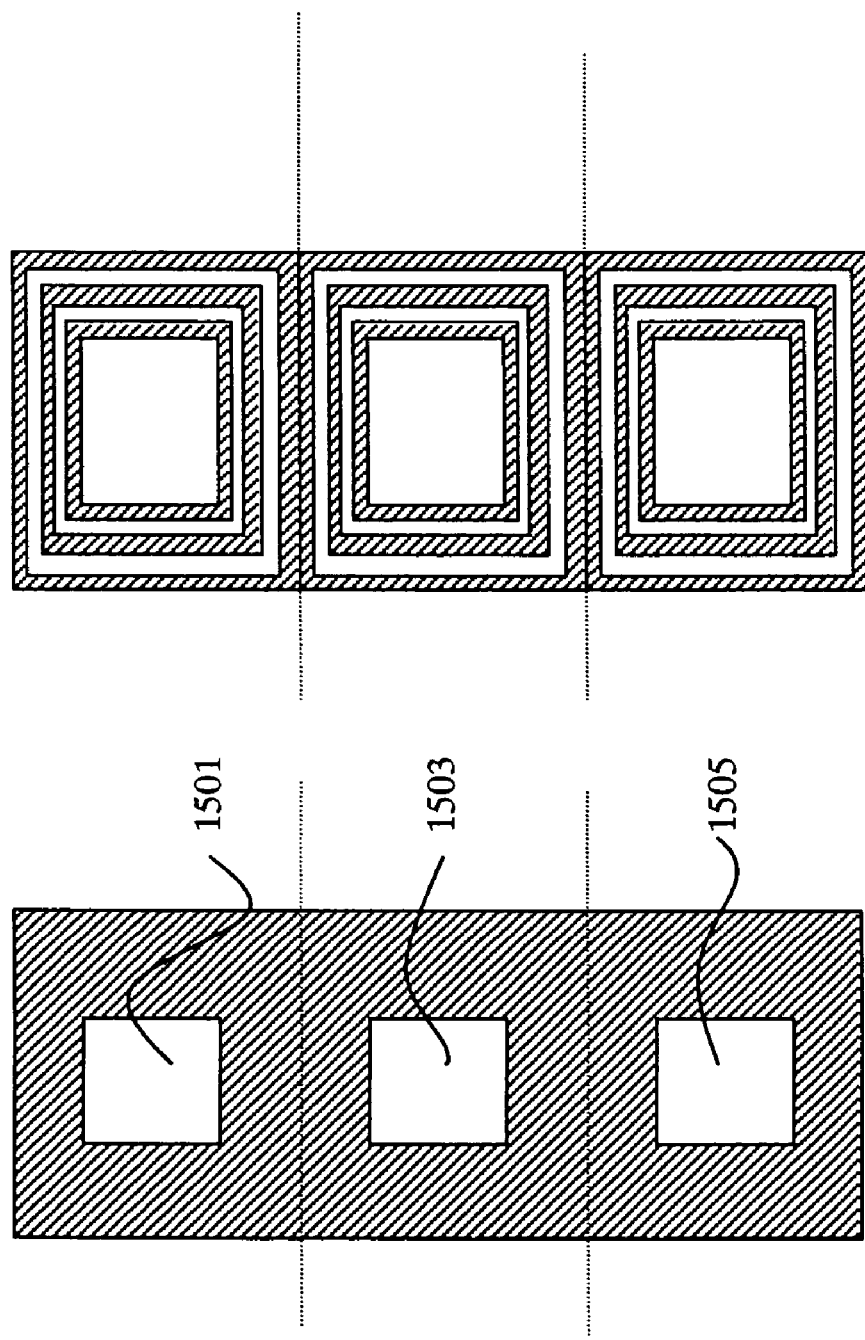

The left hand side of FIG. 15 shows three rectangular apertures 1501, 1503 and 1505 for red, green and blue sub-pixels within a single pixel, and the corresponding diffraction pattern of the condenser for each sub-pixel is as shown in the right hand side of FIG. 15. As can be seen, the backlight gain is greatly increased after the condensing effect induced by the condenser.

According to the present invention, the condenser having diffraction or refraction effect has an averaged equivalent focus 230 μm to 1250 μm. There are also several kinds of design for the condenser. FIGS. 16a~16e are five preferred embodiments of the condenser.

Figure 16A:
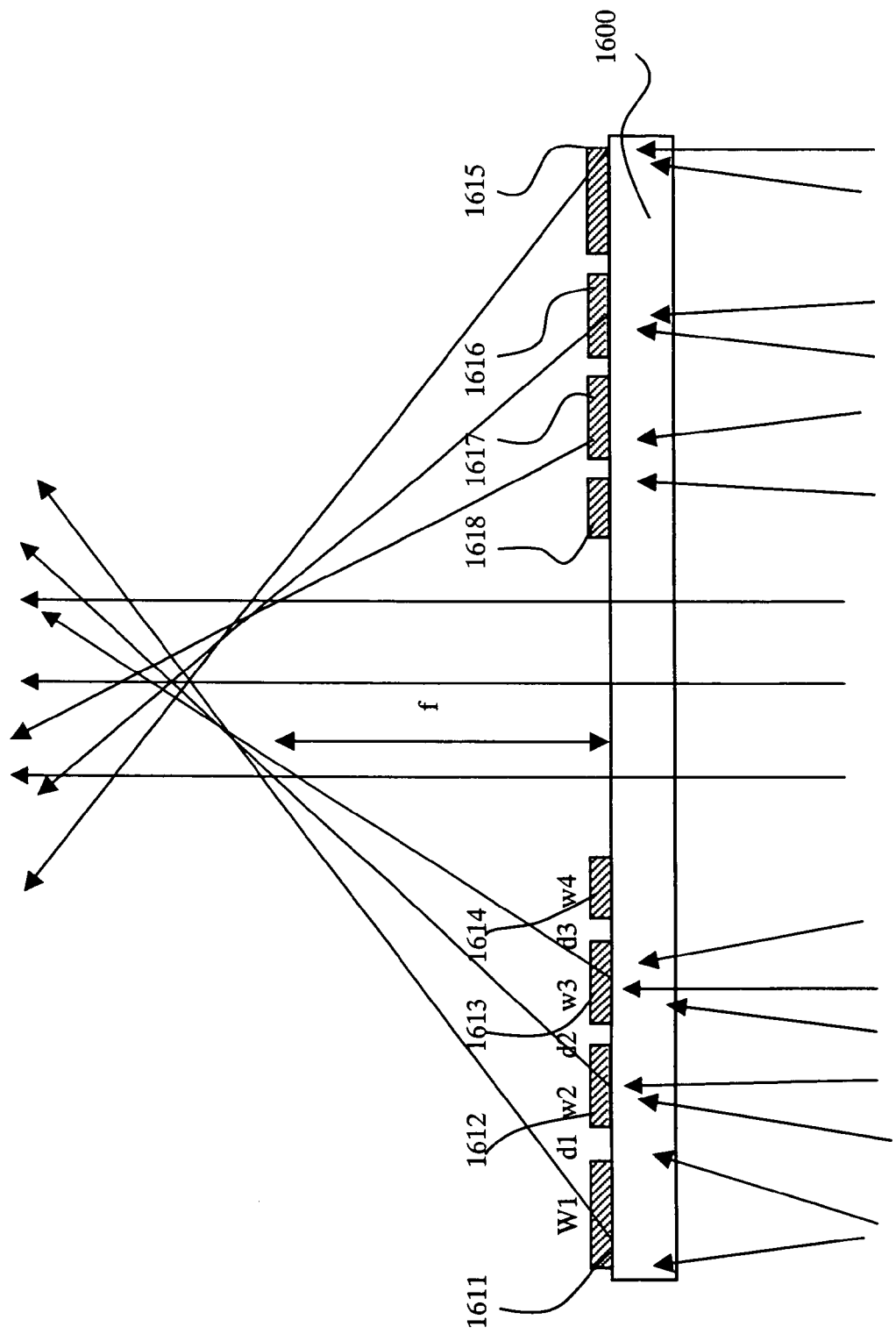
FIGS. 16a–16e show five preferred embodiments of the condenser having diffraction or refraction effect in the reflector structure according to the present invention.

FIG. 16a shows a condenser comprising several metals 1611–1618 with periodic patterns and various widths w1–w4 and distances d1–d3. The condenser can be formed on a substrate 1600 by a conventional TFT manufacturing process.

Figure 16B:
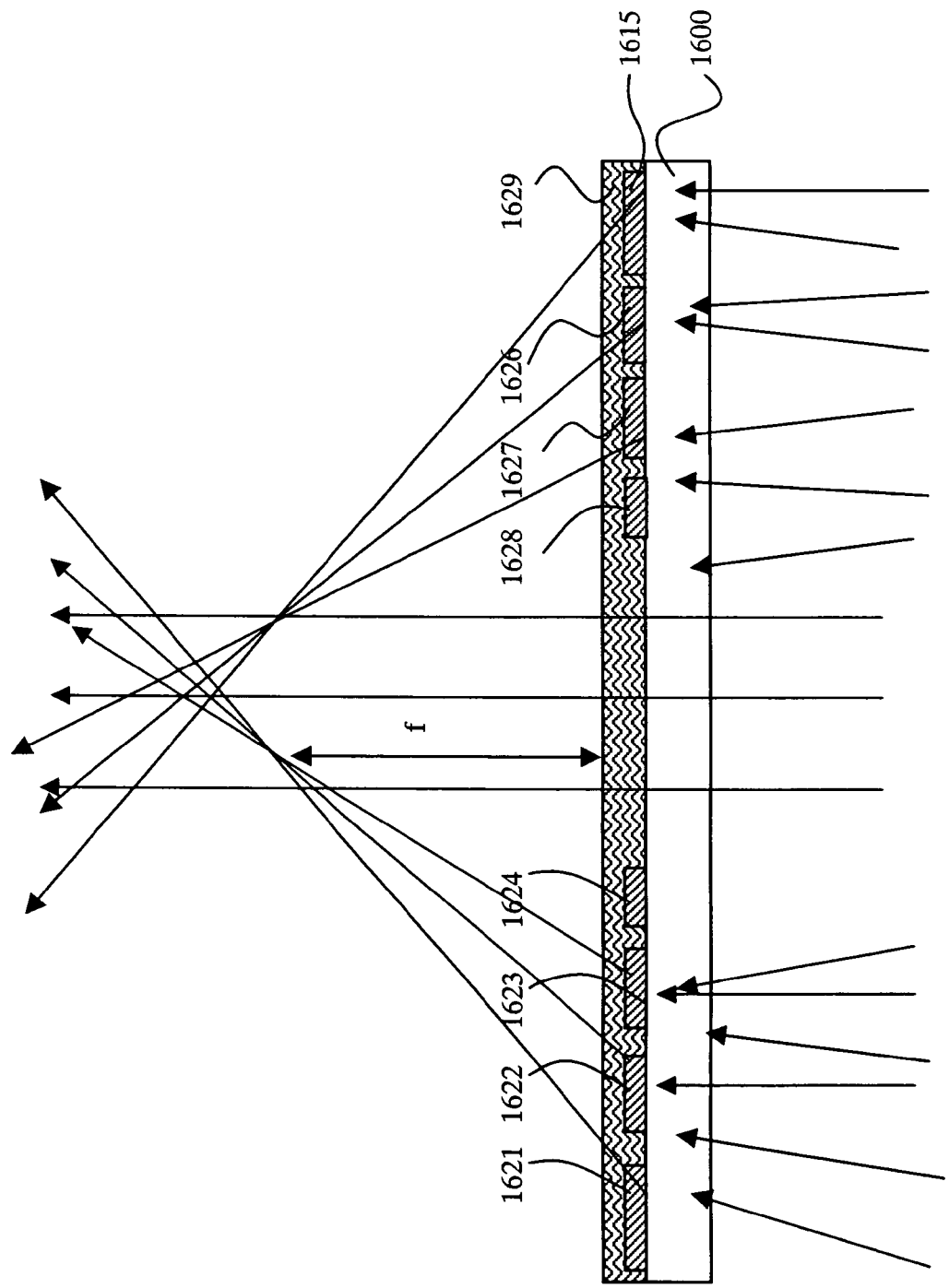

FIG. 16b shows a condenser with diffraction effect, in which the condenser comprises a layer of several transparent materials 1621–1628 with unit refractive index, periodic patterns and various widths w1–w4 and distances d1–d3, and covers another layer of transparent materials 1629 with different refractive index on the layer of transparent materials 1621–1628.

Figure 16C:
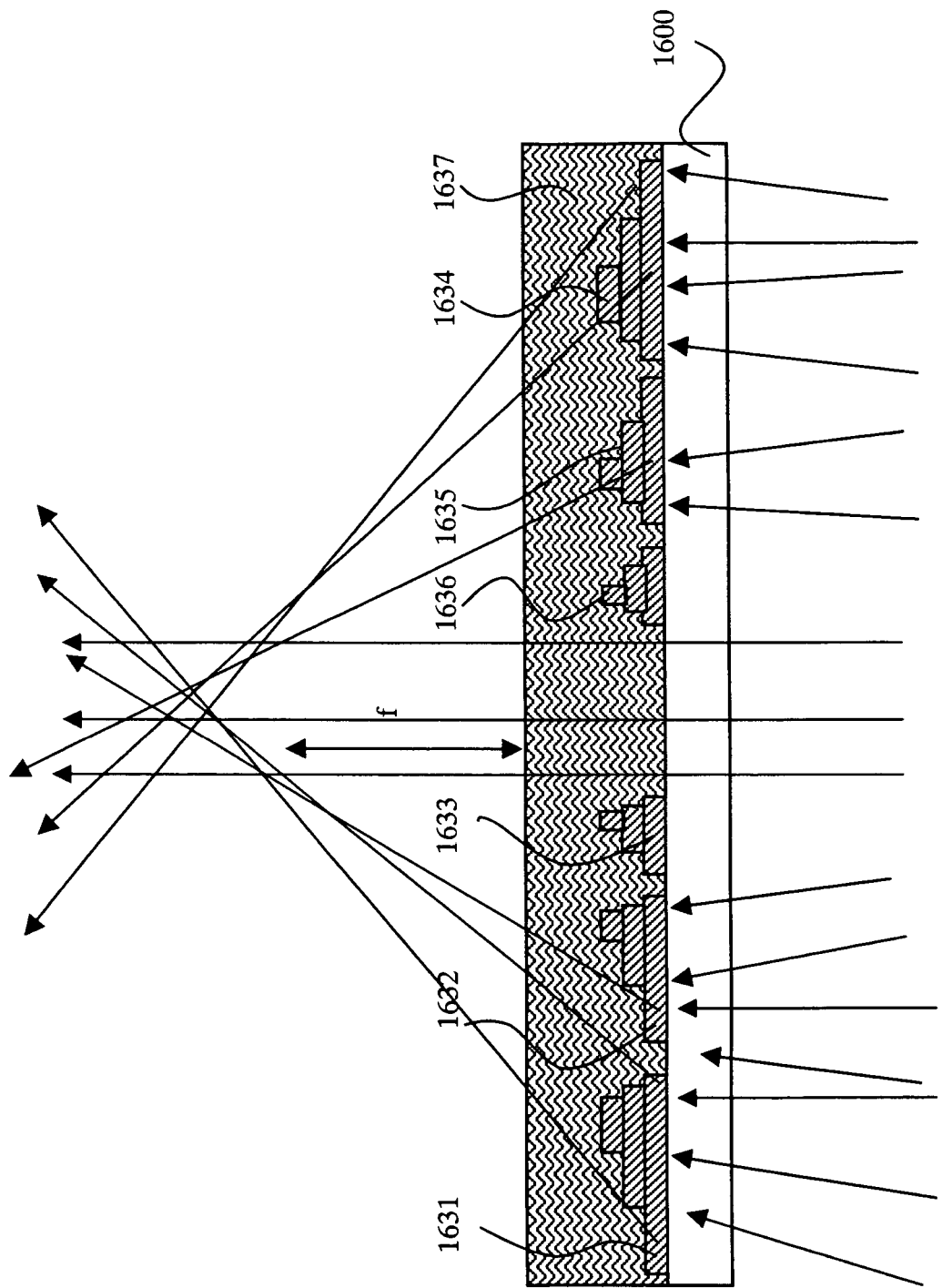

FIG. 16c shows a condenser with diffraction effect, in which the condenser comprises a layer of several multi-level transparent materials 1631–1636 with unit refractive index and periodic patterns, and covers another layer of transparent materials 1637 with different refractive index on the layer of transparent materials 1631–1636. In the preferred embodiment, the cross sectional shapes of the layer of transparent materials 1631–1636 are 3-level rectangles, as shown in FIG. 16c. Distances between every 3-level transparent material can be different. The widths of rectangular transparent materials are decreased level by level from bottom to top. The layer of transparent materials 1637 in FIG. 16c can be implemented as a spacing layer.

Figure 16D:
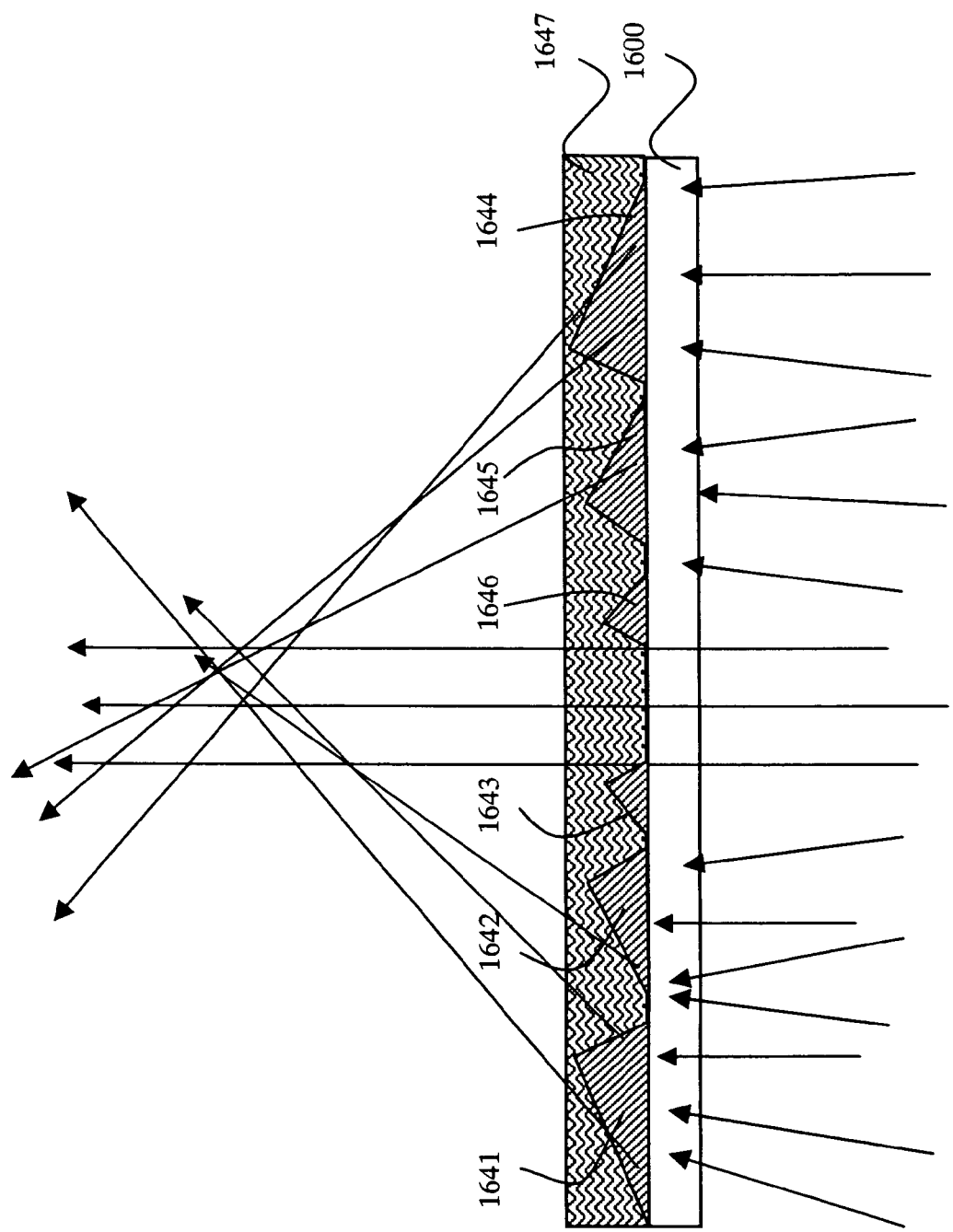

FIG. 16d shows a condenser with refraction and condensing effects, in which the condenser comprises a layer of several wedge-shaped micro prisms 1641–1646 with unit refractive index and periodic patterns, and covers another layer of transparent materials 1647 with different refractive index on the layer of micro prisms 1641–1646. The layer of transparent materials 1647 can be implemented as a spacing layer too. Micro prisms 1641–1646 can have various sizes including volumes, cross-sectional or lateral areas, slopes and heights.

Figure 16E:
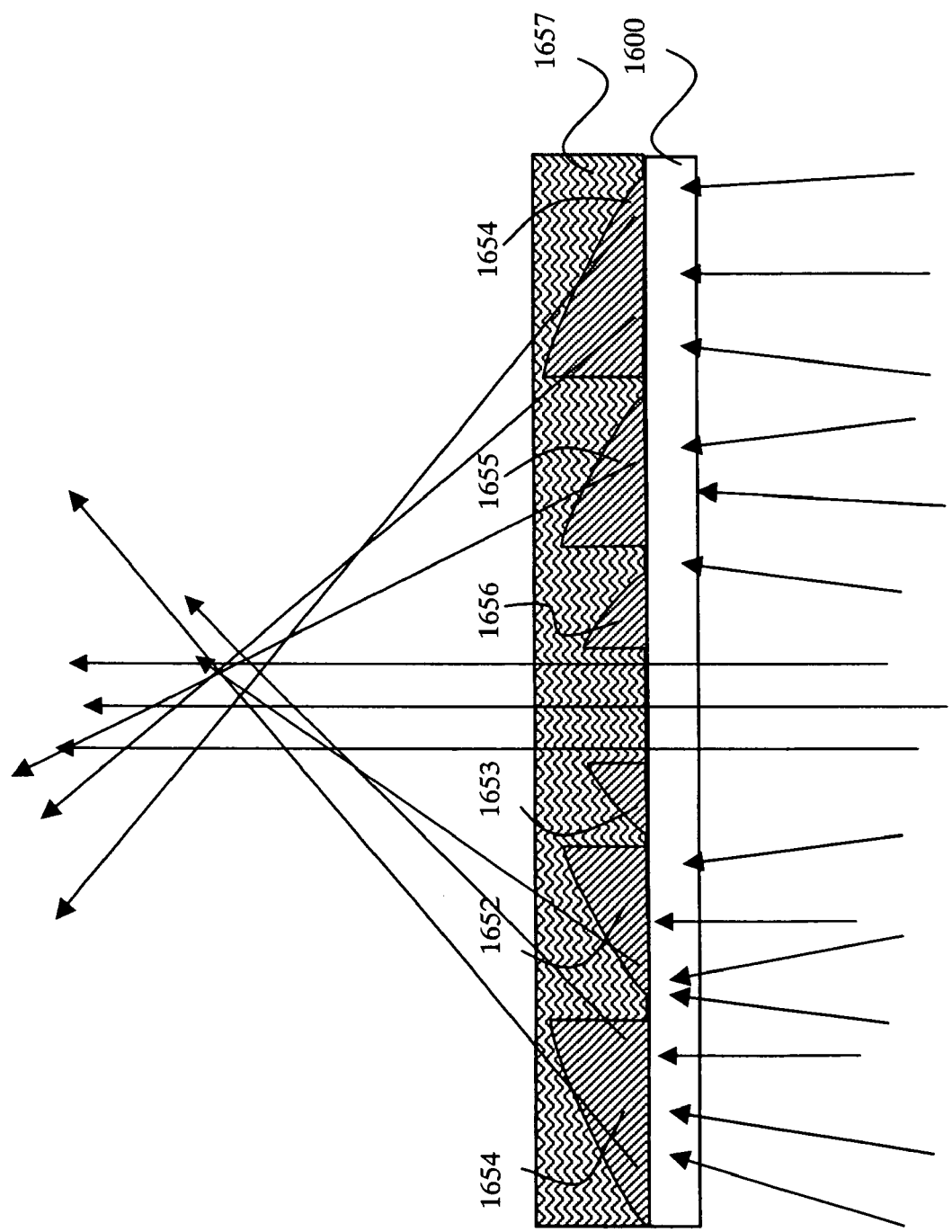

FIG. 16e shows a condenser with refraction and condensing effects, in which the condenser comprises a layer of several different sized micro lens 1651–1656 with unit refractive index and periodic patterns, and covers another layer 1657 of transparent materials with different refractive index on the layer of micro lens 1651–1656. The layer 1657 of transparent materials can be implemented as a spacing layer too.

The embodiments shown in FIGS. 16b–16e illustrate that the condensers can be made by transparent materials with various refractive indexes and have multi-order diffraction and refraction condensing effect.

Figure 17:
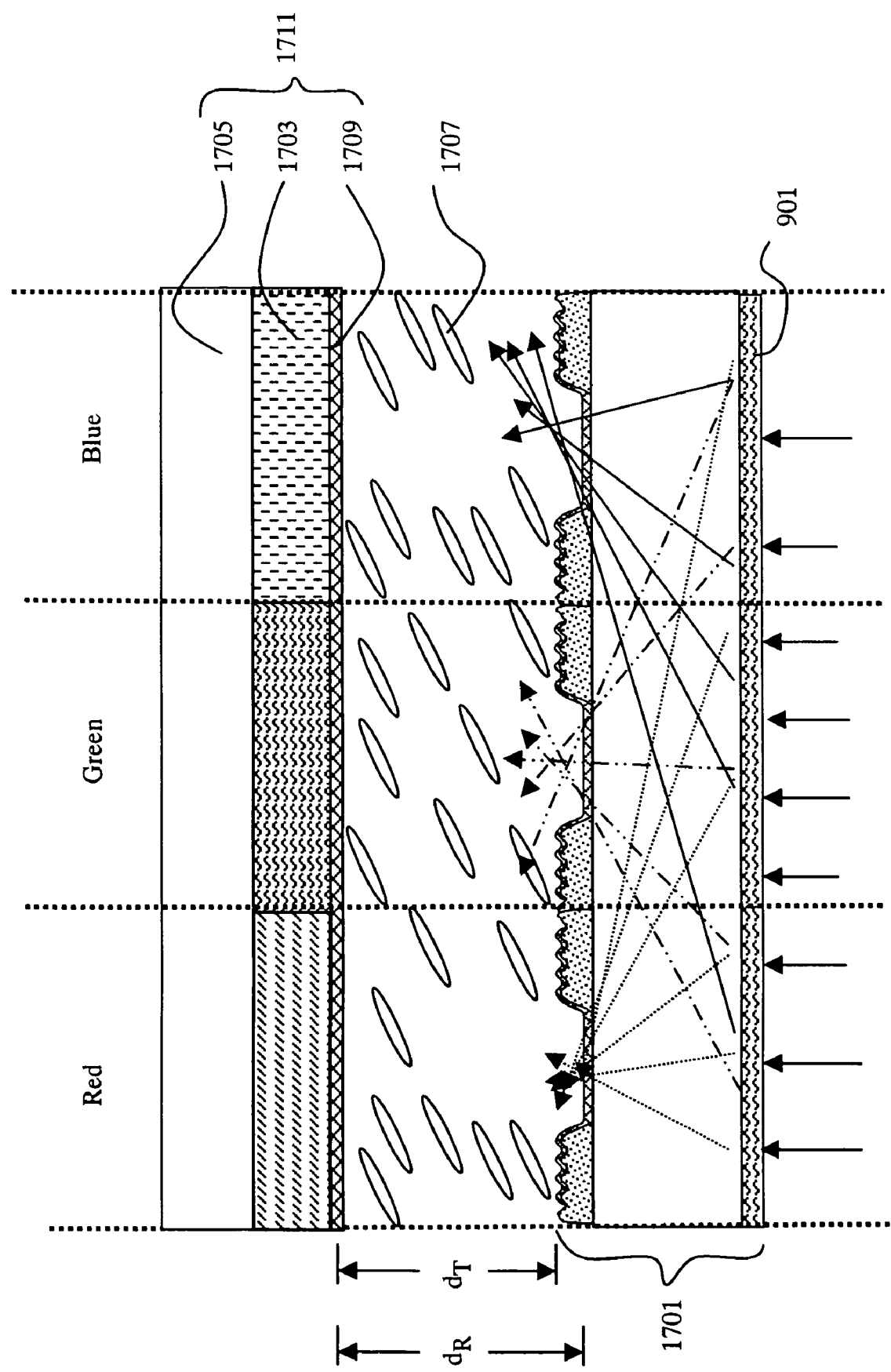
FIG. 17 shows a preferred embodiment of a partially reflective liquid crystal display having a reflector structure shown in FIG. 9.
Figure 18:
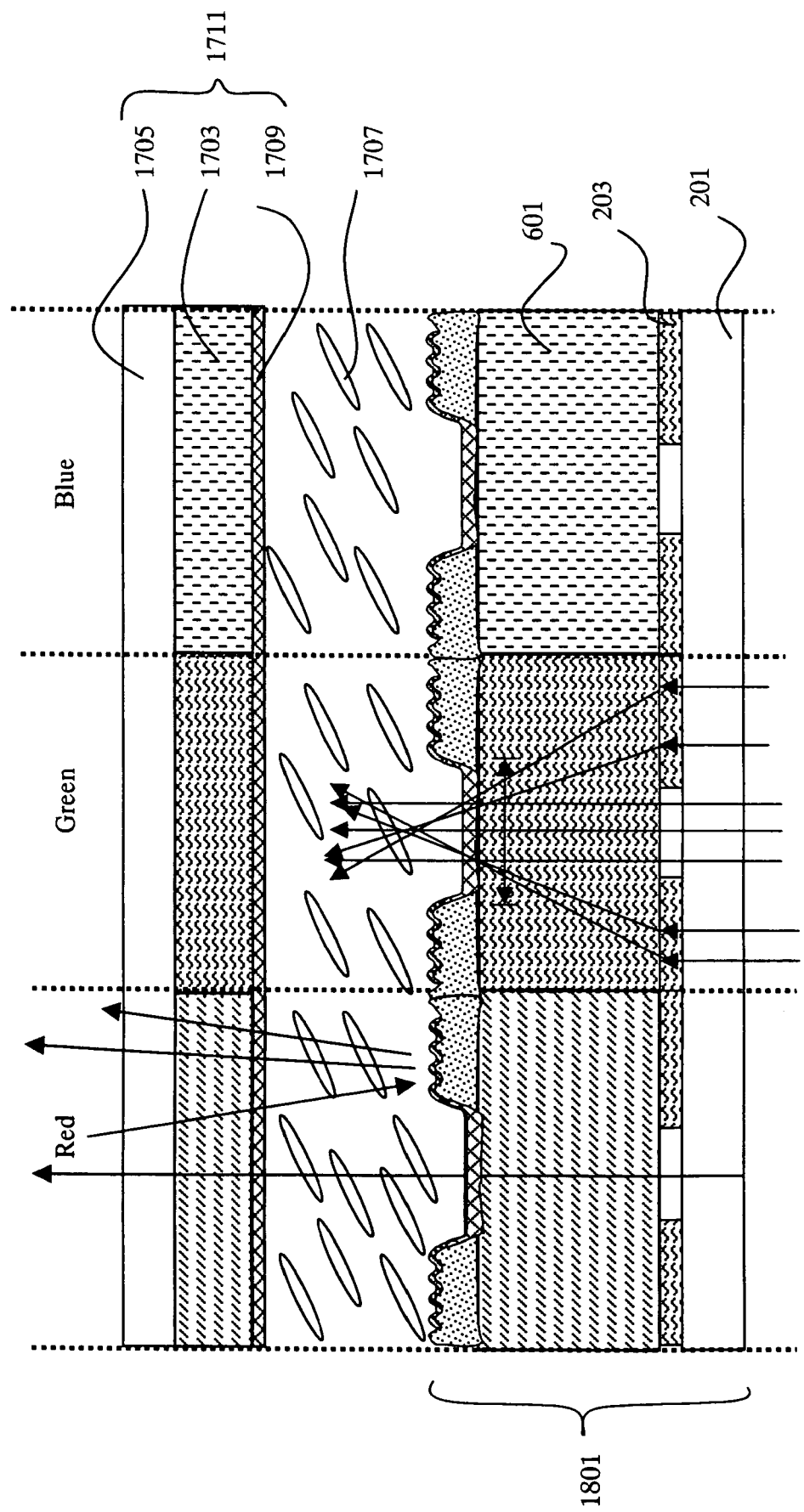
FIG. 18 shows a preferred embodiment of a partially reflective liquid crystal display having a reflector structure shown in FIG. 6.
Figure 19:
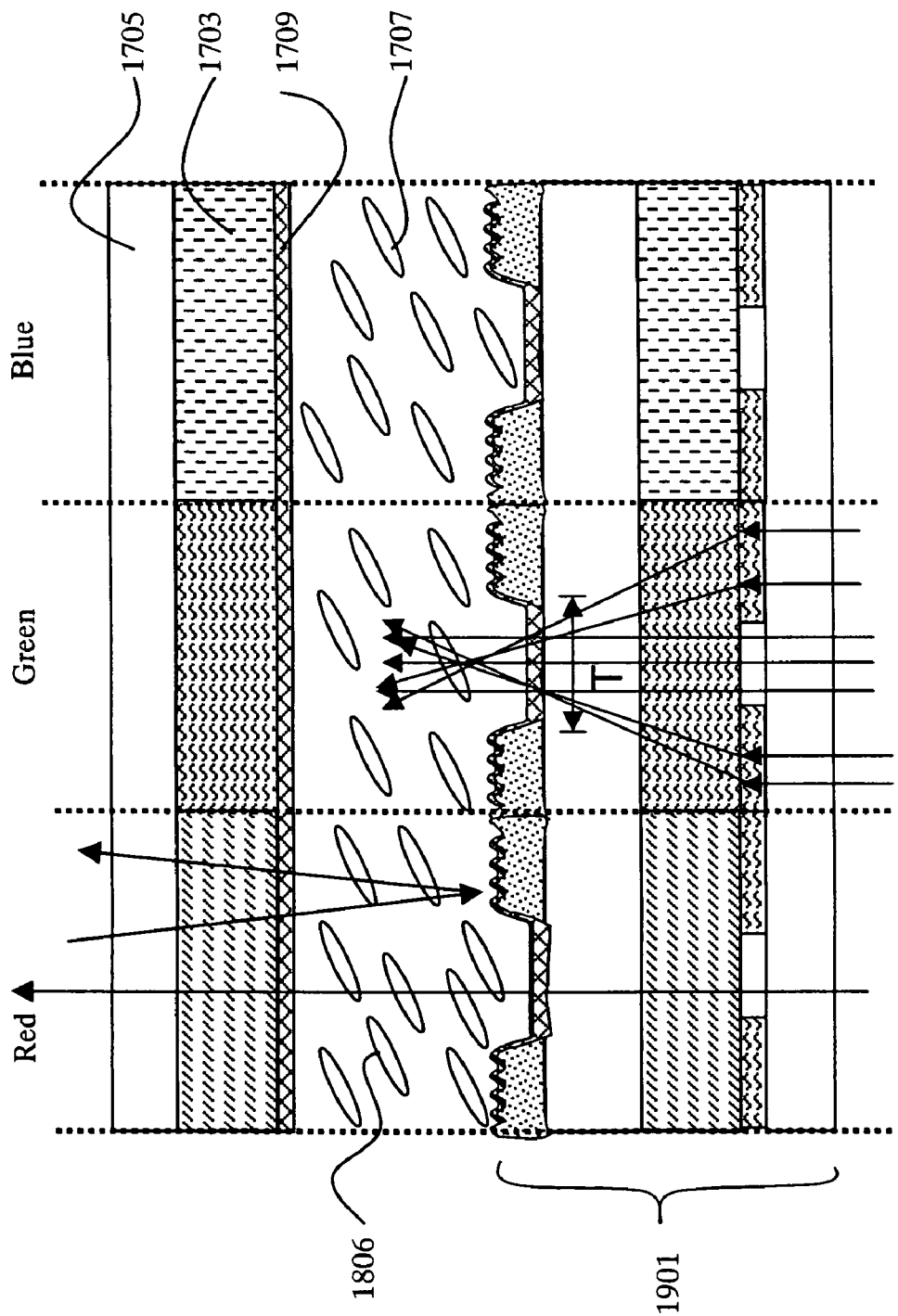
FIG. 19 shows a preferred embodiment of a partially reflective liquid crystal display having a reflector structure shown in FIG. 7.

According to the present invention, the reflector structure mentioned above can be used in partially reflective liquid crystal displays. FIGS. 17–19 show three preferred embodiments of partially reflective liquid crystal displays.

Referring to FIG. 17, the liquid crystal display comprises the reflector structure 1701 shown in FIG. 9, an upper plate 1711 including a color filter 1703, and a layer of liquid crystal cells 1707. The upper plate 1711 includes from top to bottom an upper substrate 1705, a color filter 1703 and a layer of ITO electrode layer 1709. The condenser 901 of the liquid crystal display is located at the same side with and below the TFT substrate. The color filter is located at the opposite side against the substrate. The condenser 901 divides light from the backlight source into red, green and blue lights and condenses light in their corresponding sub-pixel areas, then the light passes to the layer of liquid crystal cells 1707 and the color filter 1703.

Referring to FIG. 18, the liquid crystal display comprises the reflector structure 1801 shown in FIG. 6, an upper plate 1711 as shown in FIG. 17, and a layer of liquid crystal cells 1707. The first color filter 601 are located at the same side with the condenser 203 and the TFT substrate 201 and above the TFT substrate 201. The second color filter 1703 is located at the opposite side against the substrate 201.

Referring to FIG. 19, the liquid crystal display comprises the reflector structure 1901 shown in FIG. 7, an upper plate 1711 as shown in FIG. 17, and a layer of liquid crystal cells 1707.

According to the present invention, liquid crystal cells in the liquid crystal layer 1707 can be positive liquid crystals or negative liquid crystals. The liquid crystal gap in the transparent area is greater than that in the reflective area. The difference is about 0.16 μm to 3.3 μm. The preferred range for the bi-refractive index of positive liquid crystals is 0.05 to 0.1. The preferred range of the retardation in the transparent area is 270 nm to 460 nm. The preferred range of the retardation in the reflective area is 200 nm to 330 nm. The preferred range for the bi-refractive index of negative liquid crystals is 0.06 to 0.13. The preferred range of the retardation in the transparent area is 320 nm to 500 nm. The preferred range of the retardation in the reflective area is 150 nm to 400 nm.

In summary, the present invention uses condensers to collect light. 60% to 95% of unused backlight in the reflector structure of partially reflective liquid crystal displays is collected. The backlight gain is over 120% to 400% thereby substantially saving the power consumption for the backlight source.

Because of the convex or concave structure in the inner diffusion layer of the reflective unit, this invention needs no rubbing process to control the pre-tilt angle of the liquid crystal director. Therefore, the partially reflective liquid crystal display having the reflector structure of the invention, such as TFT-LCD, super twisted nematic (STN) LCD, mixed mode twisted nematic (MTN) LCD, forms multi-domain and further has very high contrast ratio and wide viewing angle. This invention not only can be applied to portable products, such as cellular phone and personal digital assistant (PDA), but also to mid-to-large sized monitor, such as personal computer or TV-LCD.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A reflector structure in a liquid crystal display having light condensing effect, comprising:
    a reflective layer including red, green and blue sub-pixel reflective areas each sub-pixel reflective area having an inner diffusion layer formed around a sub-pixel electrode and a reflective metal layer formed above said inner diffusion layer;
    a condenser having diffraction or refraction condensing effect, said condenser dividing and directing light from a backlight source into the sub-pixel electrodes of said red, green and blue sub-pixel reflective areas; and
    a spacing layer being formed below said reflective layer, above and covering said condenser;
    wherein the ratio of an averaged equivalent focus of said condenser to the thickness of said spacing layer is between 0.65 and 1.4.

2. The reflector structure in a liquid crystal display having light condensing effect as claimed in claim 1, wherein said reflector structure further includes an active device substrate formed above said condenser.

3. The reflector structure in a liquid crystal display having light condensing effect as claimed in claim 1, wherein said spacing layer is an active device substrate.

4. The reflector structure in a liquid crystal display having light condensing effect as claimed in claim 1, wherein said condenser having an averaged equivalent focus between 230 µm to 1250 µm.

5. The reflector structure in a liquid crystal display having light condensing effect as claimed in claim 1, wherein said spacing layer is an over coat layer.

6. The reflector structure in a liquid crystal display having light condensing effect as claimed in claim 1, wherein said spacing layer is a color filter.

7. The reflector structure in a liquid crystal display having light condensing effect as claimed in claim 1, said spacing layer further comprising:
    a color filter formed above said condenser; and
    an over coat layer formed above said color filter.

8. A liquid crystal display comprising:
    a reflector structure having light condensing effect, said reflective structure having:
        a reflective layer including red, green and blue sub-pixel reflective areas each sub-pixel reflective area having an inner diffusion layer formed around a sub-pixel electrode and a reflective metal layer formed above said inner diffusion layer;
        a condenser having diffraction or refraction condensing effect said condenser dividing and directing light from a backlight source into the sub-pixel electrodes of said red, green and blue sub-pixel reflective areas; and
        a spacing layer being formed below said reflective layer, above and covering said condenser, the ratio of an averaged equivalent focus of said condenser to the thickness of said spacing layer being between 0.65 and 1.4;
    a layer of liquid crystal cells above said reflector structure;
    an ITO electrode layer above said layer of liquid crystal cells;
    a layer of color filter above said ITO electrode layer; and
    an upper substrate.

9. The liquid crystal display as claimed in claim 8, wherein the liquid crystal cells in said liquid crystal layer are positive or negative liquid crystals.

10. The liquid crystal display having light condensing effect as claimed in claim 9, wherein the liquid crystal cells in said liquid crystal layer are positive liquid crystals having a bi-refractive index between 0.05 and 0.1.

11. The liquid crystal display having light condensing effect as claimed in claim 9, wherein the liquid crystal cells in said liquid crystal layer are negative liquid crystals having a bi-refractive index between 0.06 and 0.13.

* * * * *